US011977414B2

(12) United States Patent
Park et al.

(10) Patent No.: US 11,977,414 B2
(45) Date of Patent: May 7, 2024

(54) ELASTIC MEMBER

(71) Applicant: LG INNOTEK CO., LTD., Seoul (KR)

(72) Inventors: Duck Hoon Park, Seoul (KR); Sung Won Kang, Seoul (KR); Sang Jun Ko, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/921,430

(22) PCT Filed: Apr. 14, 2021

(86) PCT No.: PCT/KR2021/004707
§ 371 (c)(1),
(2) Date: Oct. 26, 2022

(87) PCT Pub. No.: WO2021/221357
PCT Pub. Date: Nov. 4, 2021

(65) Prior Publication Data
US 2023/0195169 A1 Jun. 22, 2023

(30) Foreign Application Priority Data

Apr. 27, 2020 (KR) .................. 10-2020-0051010
Dec. 16, 2020 (KR) .................. 10-2020-0176498

(51) Int. Cl.
*G06F 1/16* (2006.01)
*H04M 1/02* (2006.01)

(52) U.S. Cl.
CPC ........ *G06F 1/1652* (2013.01); *H04M 1/0268* (2013.01); *G06F 2203/04102* (2013.01)

(58) Field of Classification Search
CPC ......... G06F 1/1652; G06F 2203/04102; G06F 1/16; H04M 1/0268; H04M 1/0216; F16F 1/18; G09F 9/30
See application file for complete search history.

(56) References Cited

U.S. PATENT DOCUMENTS 10,134,827 B2   11/2018   Choi et al.
10,490,771 B2   11/2019   Kim et al.
(Continued)

FOREIGN PATENT DOCUMENTS

KR   10-2015-0020895   2/2015
KR   10-2018-0021293   3/2018
(Continued)

OTHER PUBLICATIONS

International Search Report dated Aug. 13, 2021 issued in Application No. PCT/KR2021/004707.

*Primary Examiner* — Ibrahim A Khan
(74) *Attorney, Agent, or Firm* — KED & ASSOCIATION, LLP

(57) ABSTRACT

An elastic member according to an embodiment includes a first surface and a second surface opposite to the first surface and a first region and a second region, wherein a first direction in a length direction and a second direction in a width direction are defined, the first region is defined as a folding region, and the second region is defined as an unfolding region, a first pattern portion having an intaglio shape and a second pattern portion having an embossed shape are formed in the first region, the second pattern portion includes a plurality of first patterns and a plurality of second patterns that are spaced apart from each other, and a length of the first pattern extends in a second direction, and a length of the second pattern extends in the first direction.

20 Claims, 19 Drawing Sheets

(56) References Cited

U.S. PATENT DOCUMENTS

| | | | | |
|---|---|---|---|---|
| 10,945,343 | B2* | 3/2021 | Yoon | G06F 1/1652 |
| 2014/0126133 | A1* | 5/2014 | Griffin | G06F 1/1652 |
| | | | | 312/326 |
| 2016/0014881 | A1* | 1/2016 | Shin | G06F 1/1616 |
| | | | | 361/749 |
| 2016/0188098 | A1* | 6/2016 | Her | G06F 1/1652 |
| | | | | 345/173 |
| 2016/0270209 | A1* | 9/2016 | Cho | H10K 59/805 |
| 2016/0357052 | A1* | 12/2016 | Kim | H10K 50/84 |
| 2017/0003821 | A1* | 1/2017 | Jeon | G06F 3/0412 |
| 2017/0294495 | A1* | 10/2017 | Shyu | H10K 59/35 |
| 2018/0102496 | A1* | 4/2018 | Kim | H10K 50/87 |
| 2018/0190936 | A1* | 7/2018 | Lee | B32B 3/18 |
| 2019/0097178 | A1* | 3/2019 | Cho | G06F 3/045 |
| 2019/0302850 | A1 | 10/2019 | Park et al. | |
| 2022/0050321 | A1 | 2/2022 | Park et al. | |

FOREIGN PATENT DOCUMENTS

| | | |
|---|---|---|
| KR | 10-2018-0036857 | 4/2018 |
| KR | 10-2019-0080740 | 7/2019 |
| KR | 10-2019-0116592 | 10/2019 |
| KR | 10-2020-0034333 | 3/2020 |

* cited by examiner

[FIG. 1]
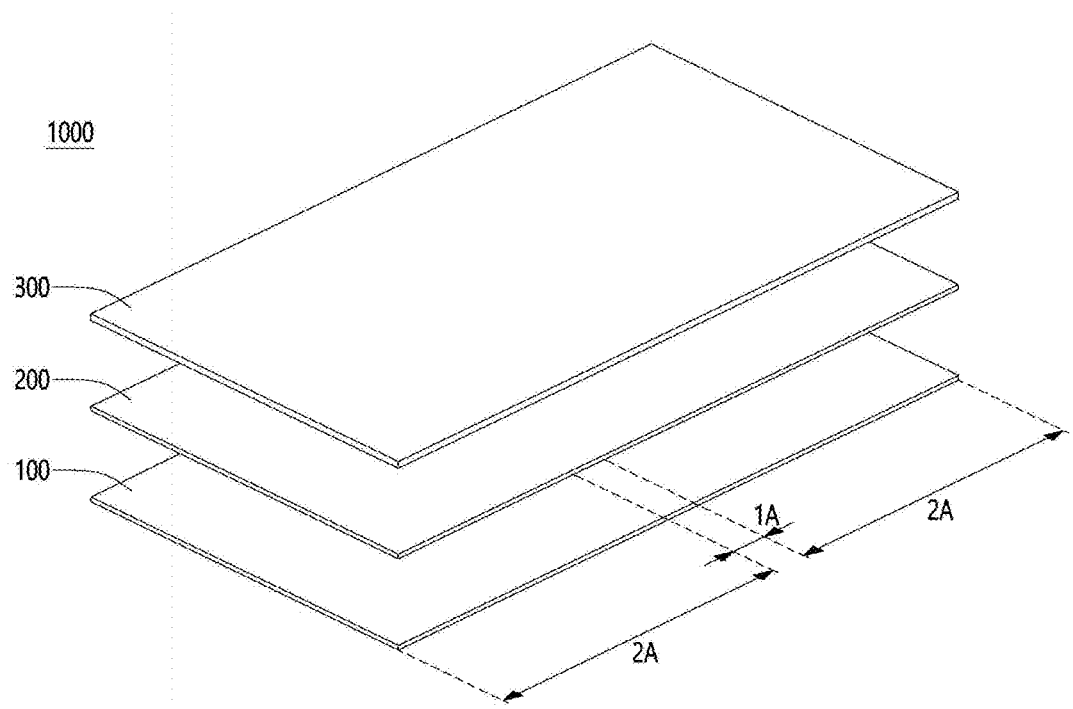

[FIG. 2]
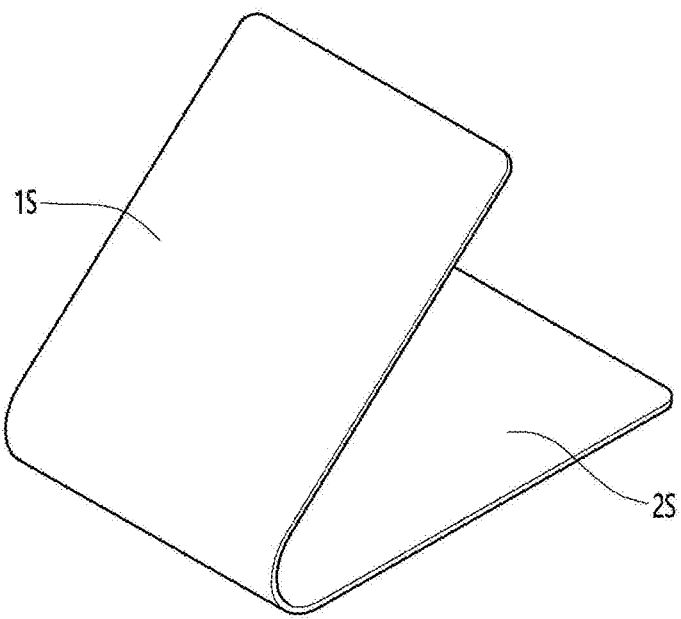
[FIG. 3]
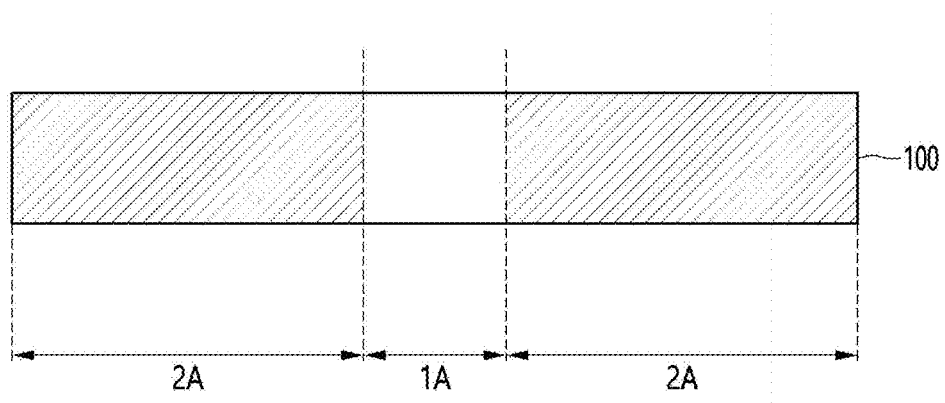

[FIG. 4]
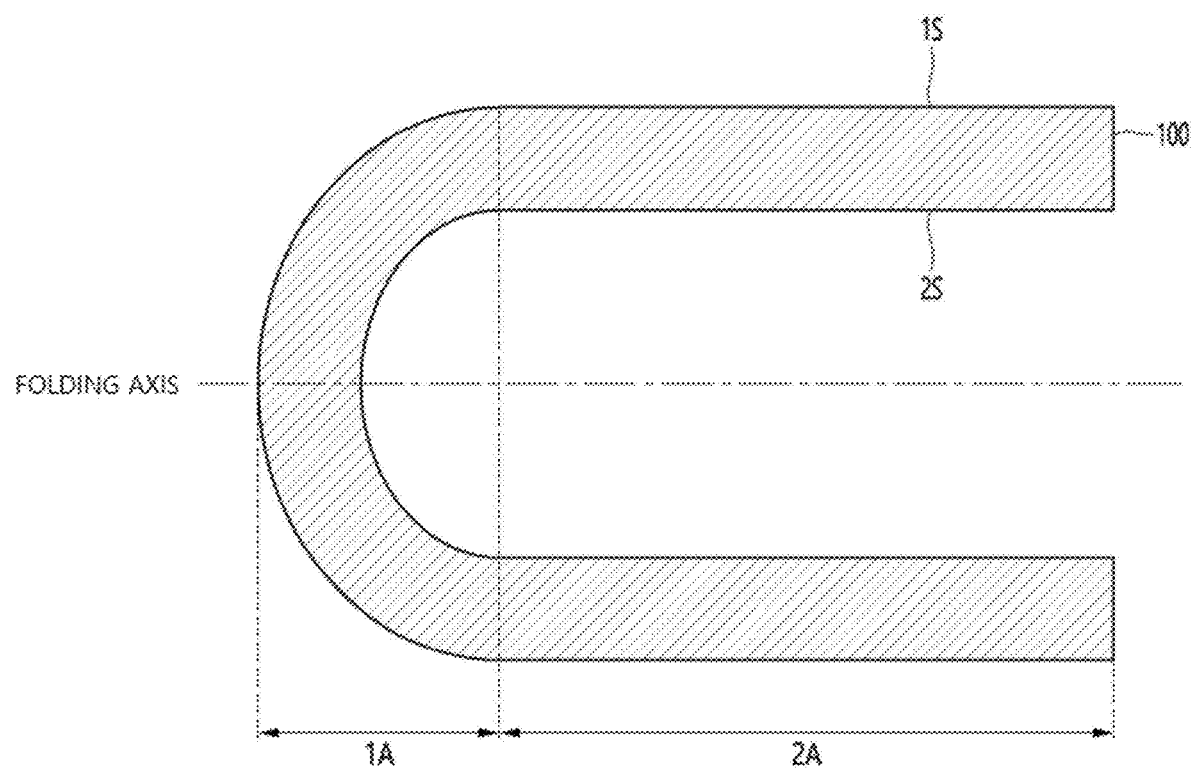

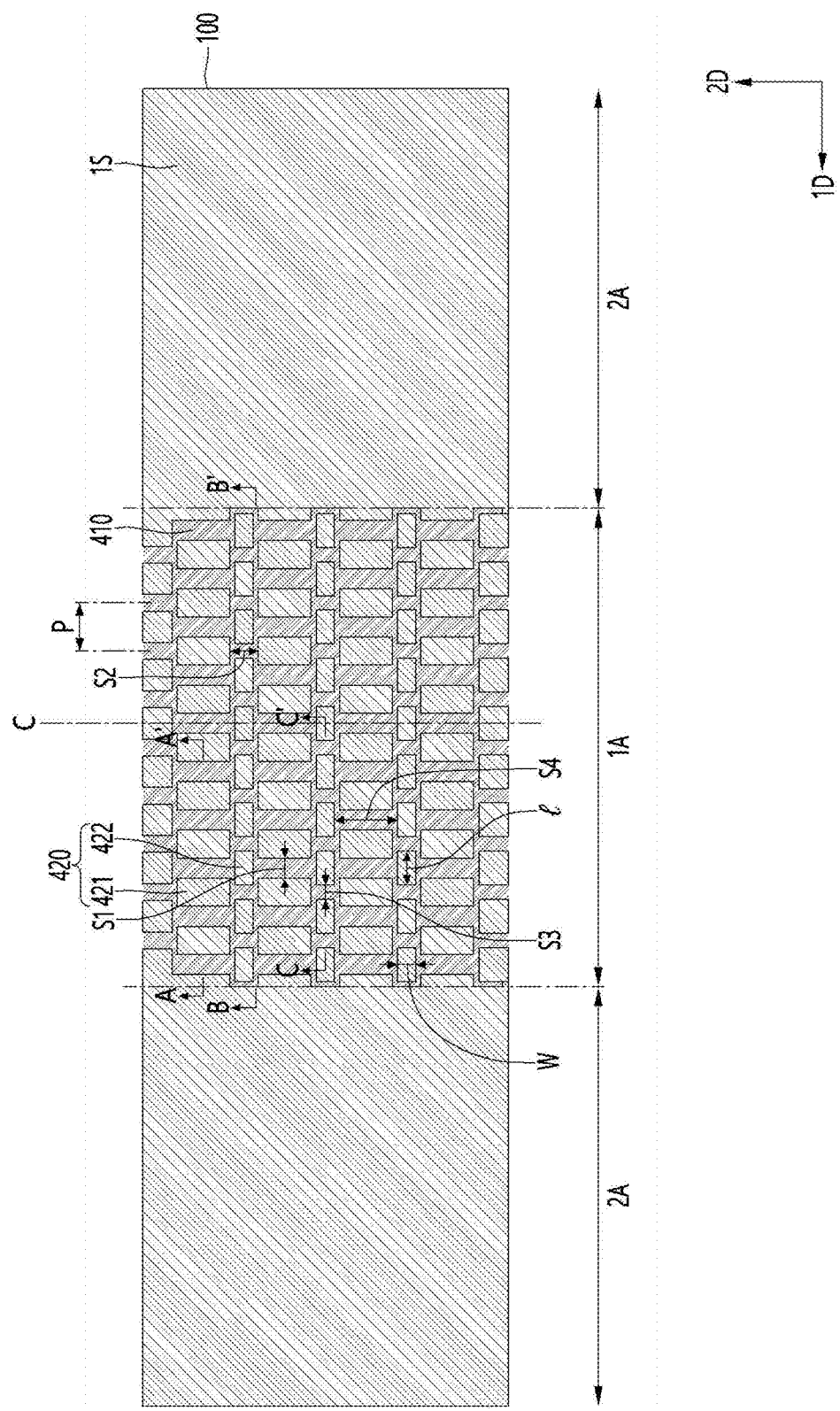
[FIG. 5]

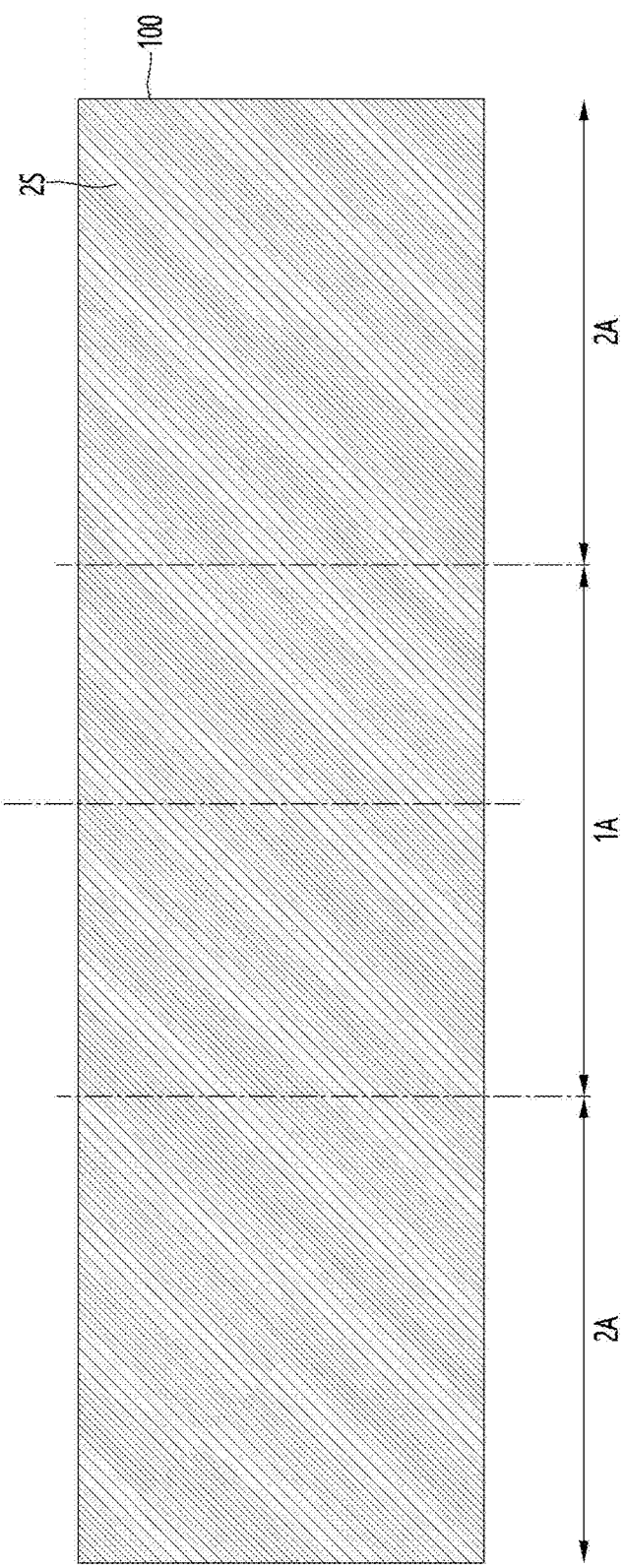

[FIG. 7]
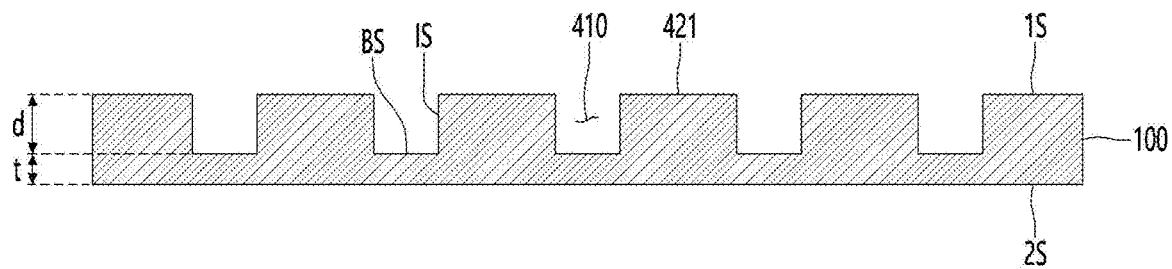
[FIG. 8]
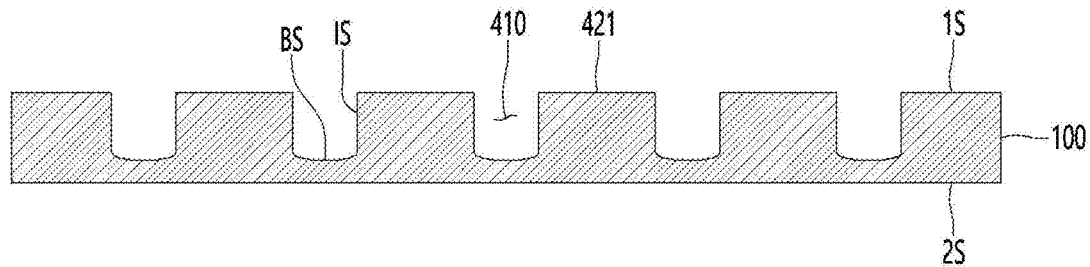
[FIG. 9]
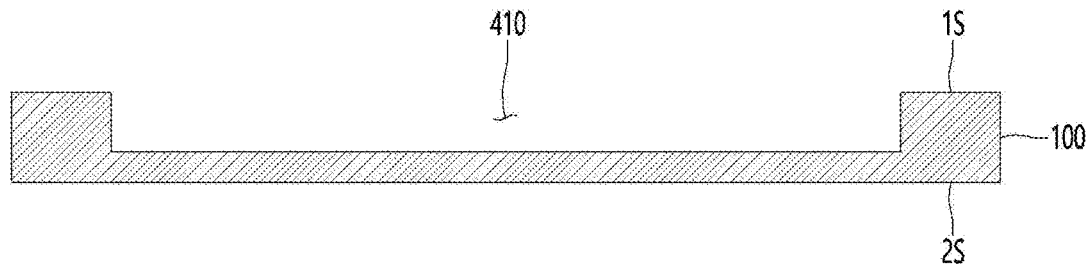
[FIG. 10]
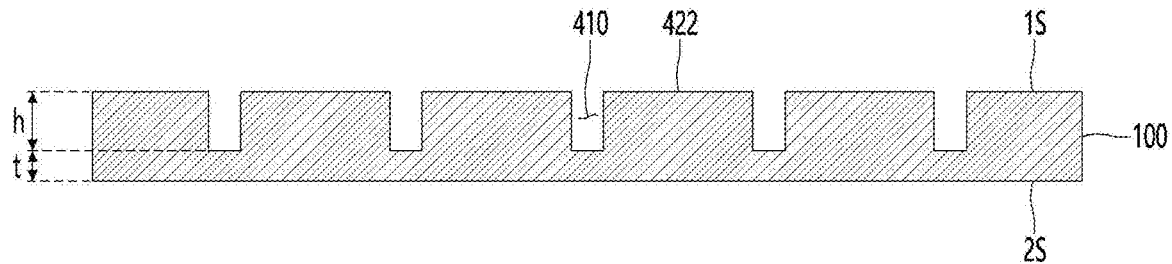

[FIG. 11]
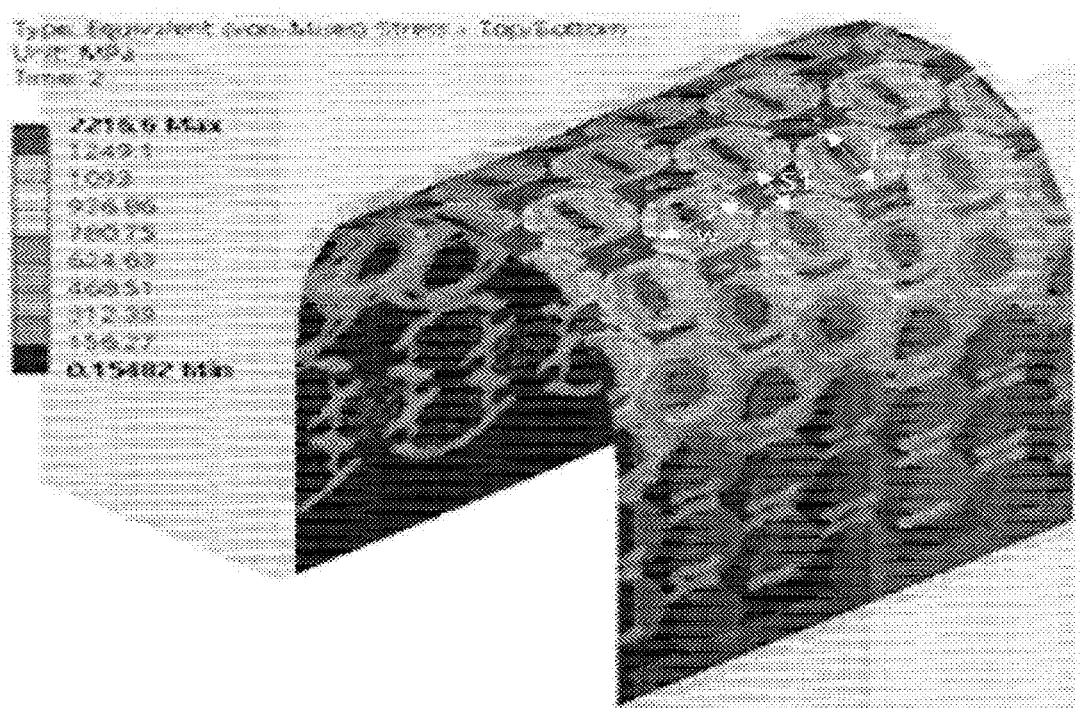

[FIG. 12]
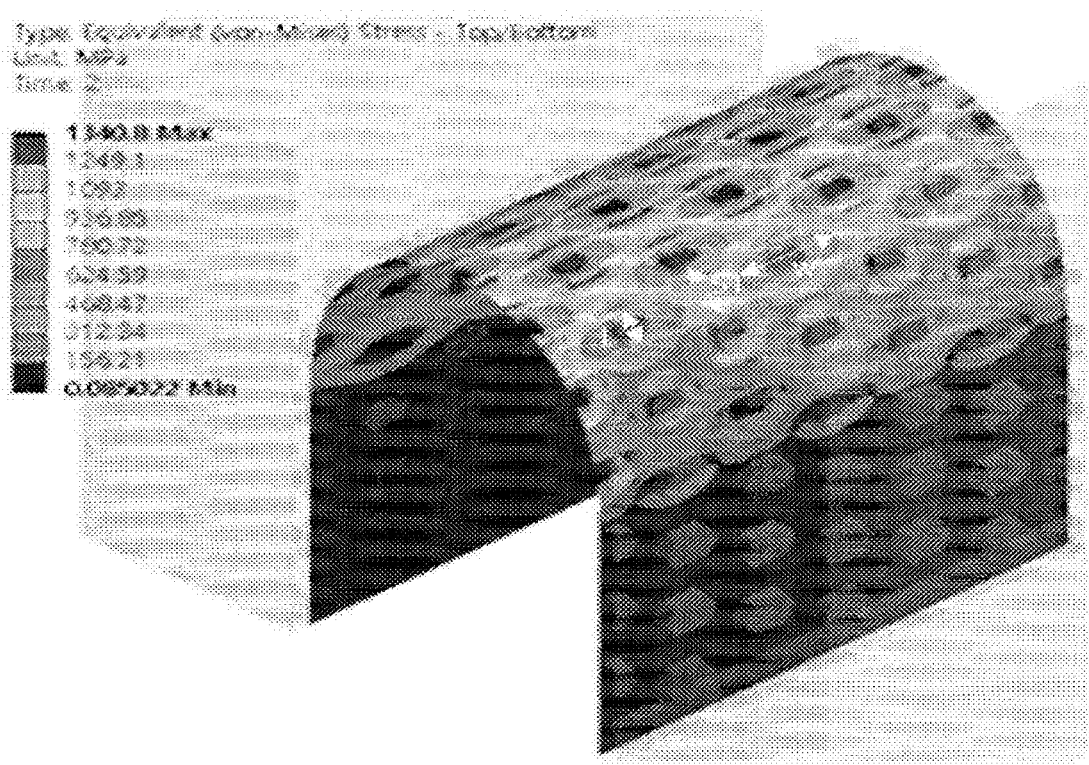

[FIG. 13]
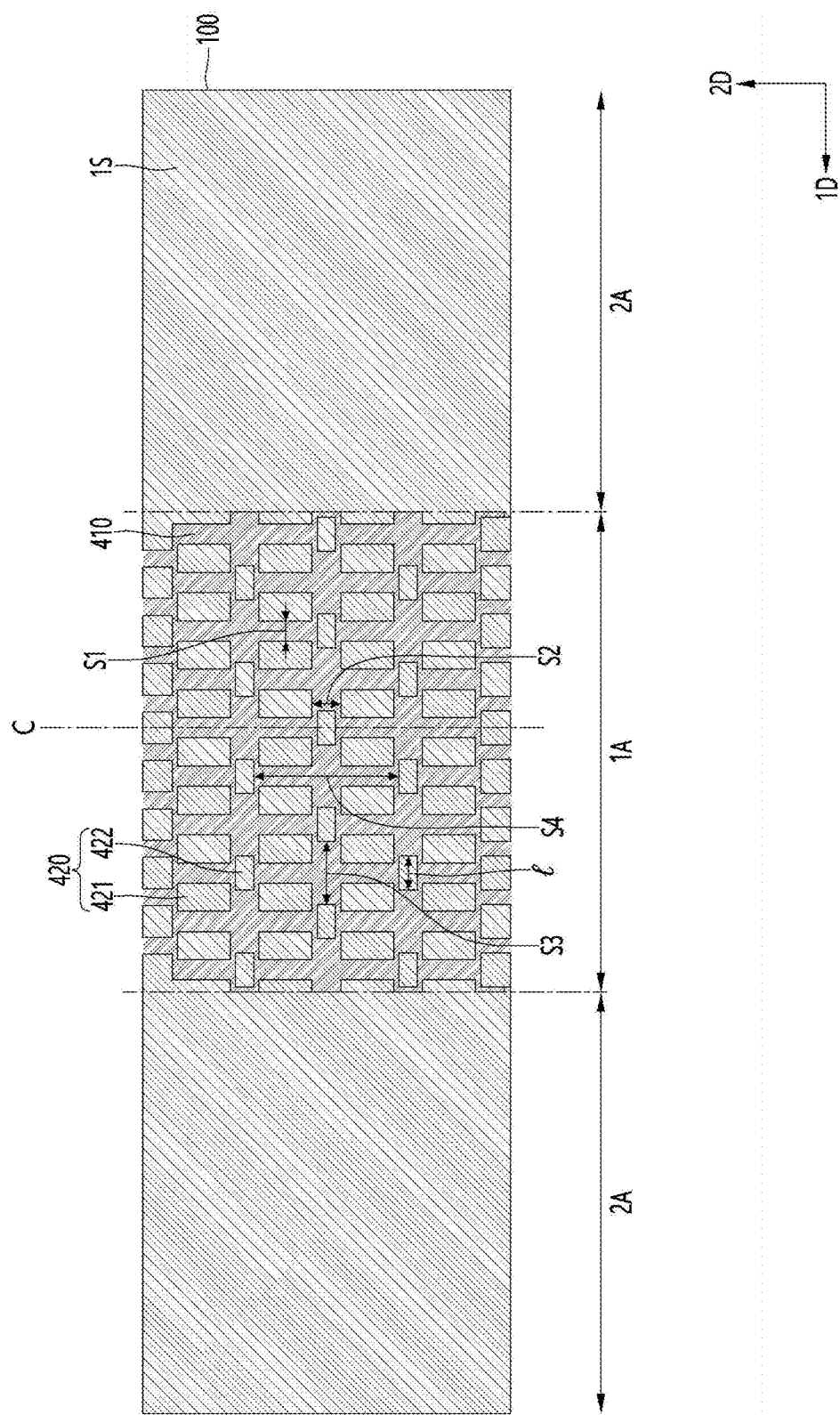

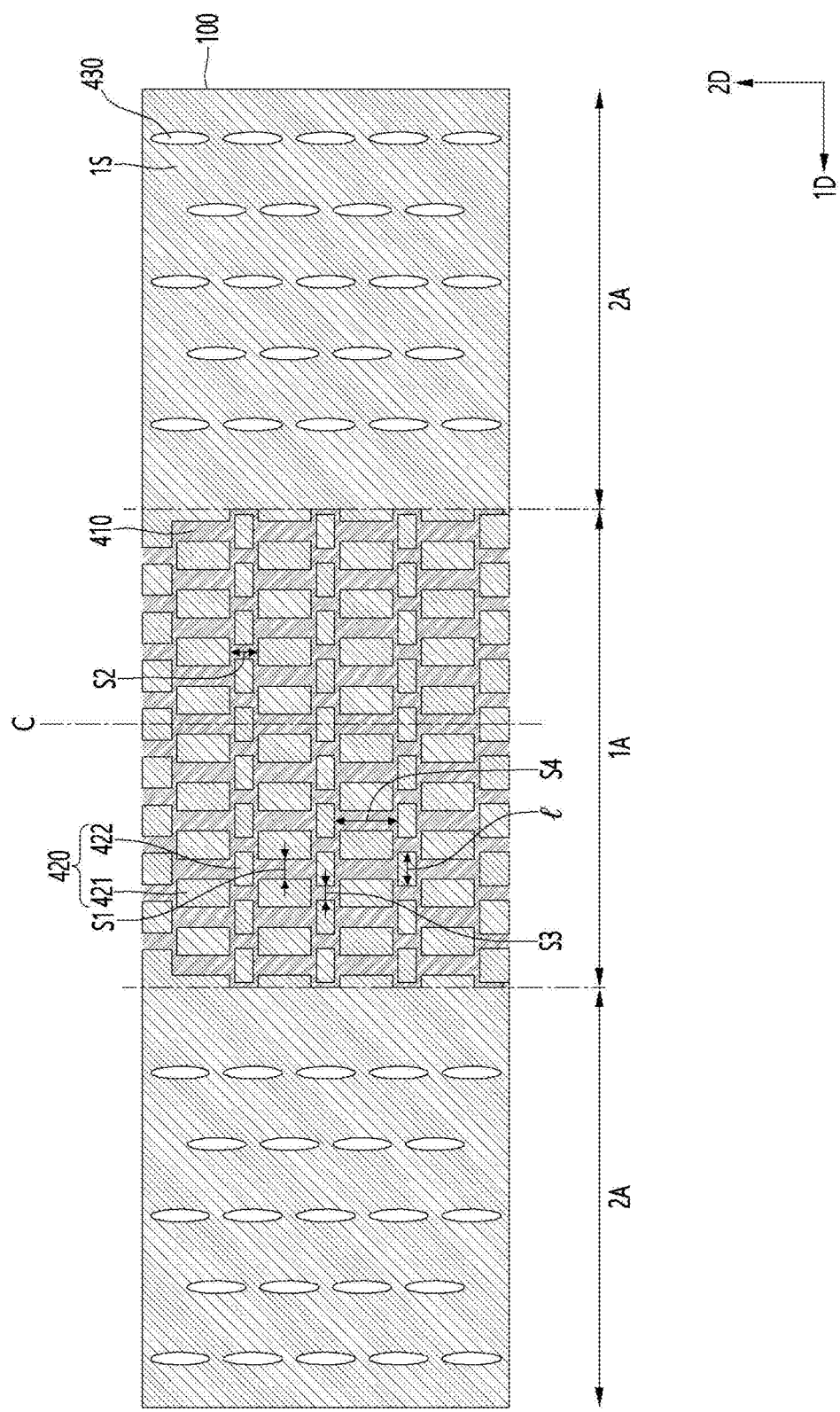

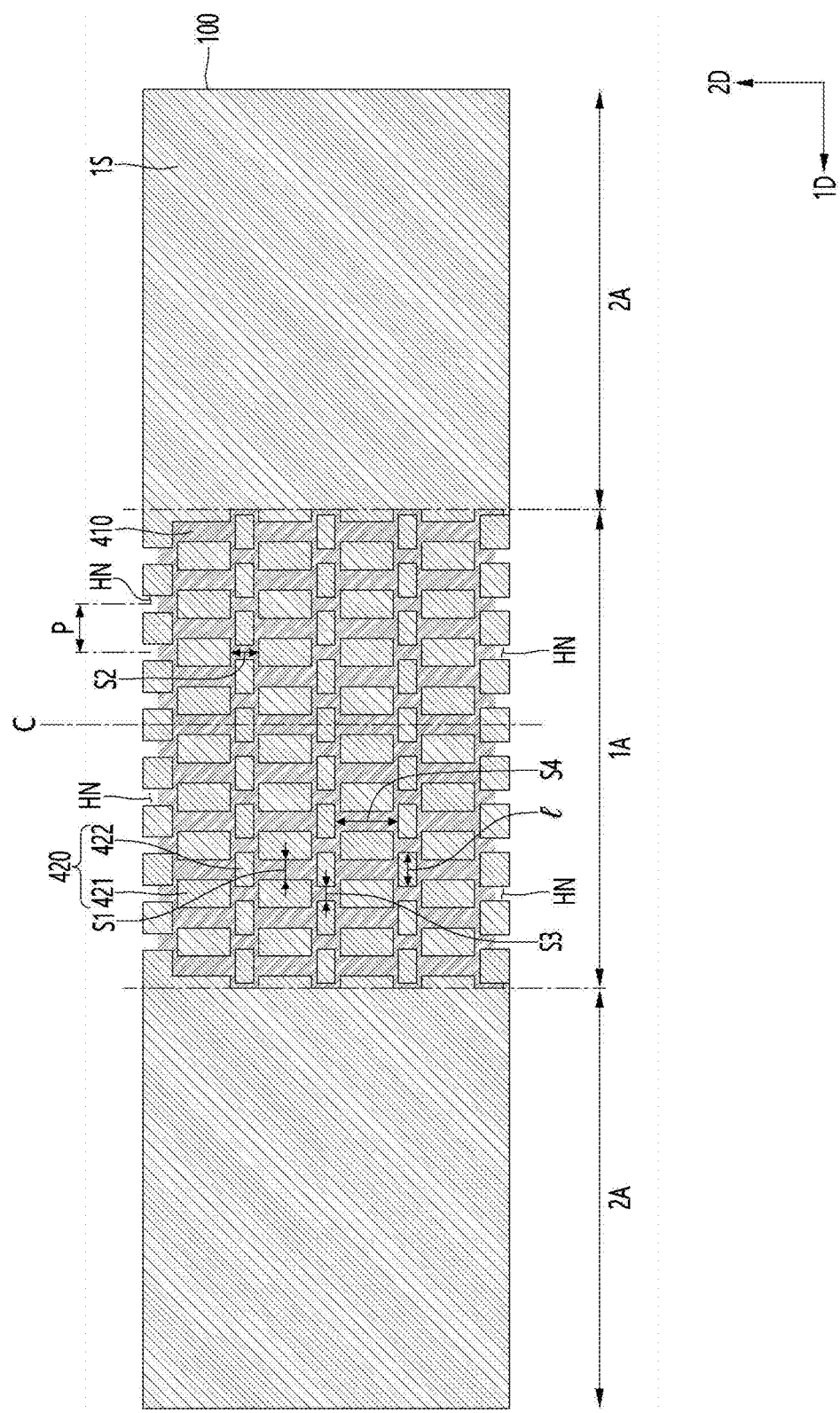
[FIG. 15]

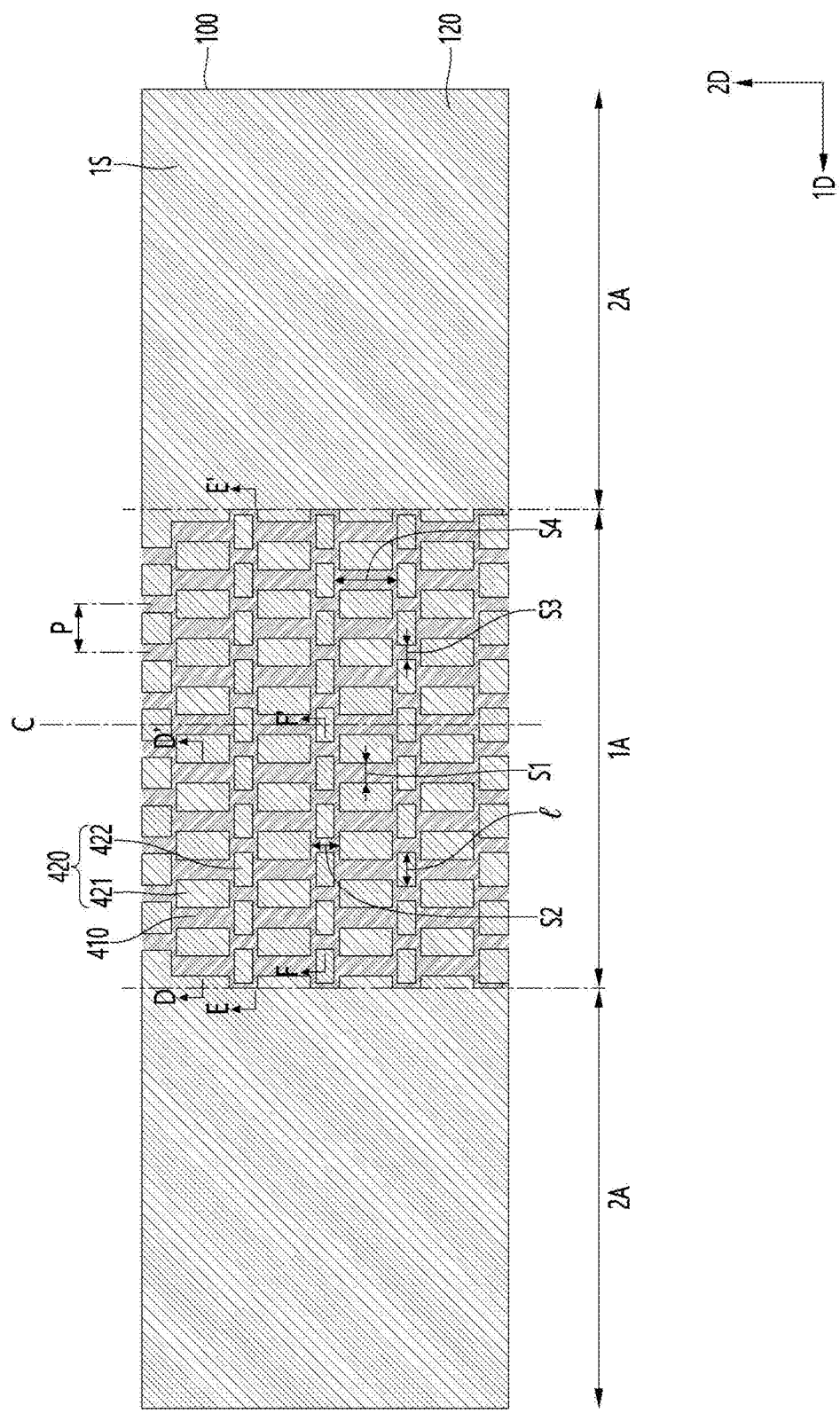

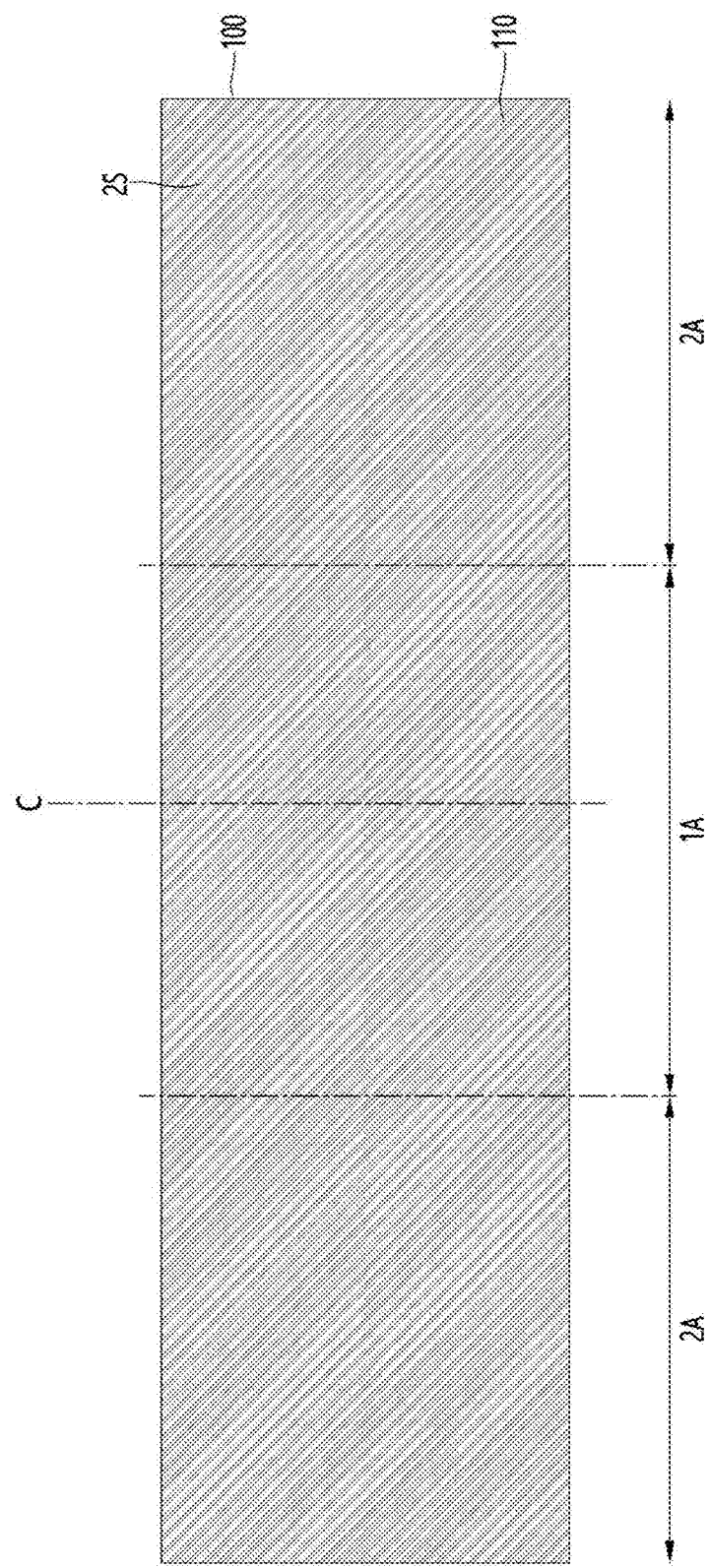

[FIG. 18]
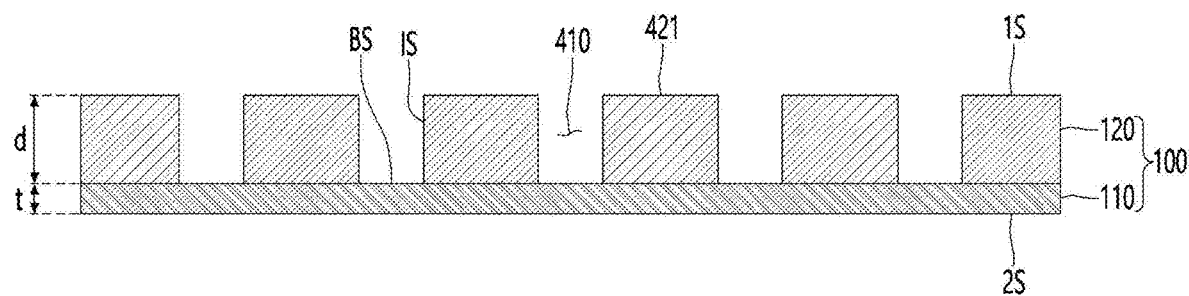
[FIG. 19]
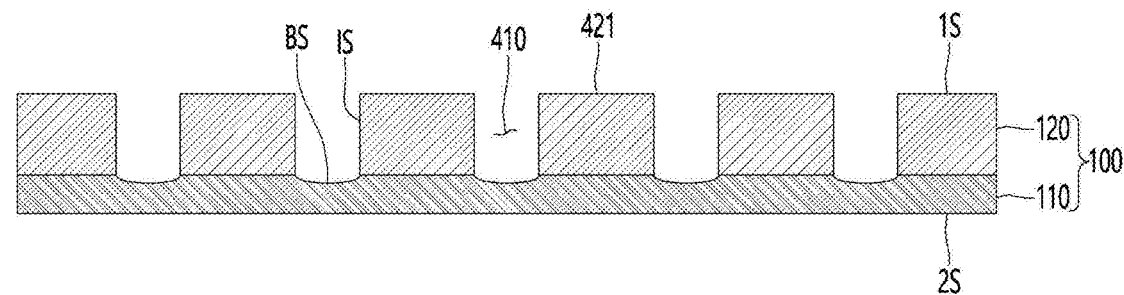
[FIG. 20]
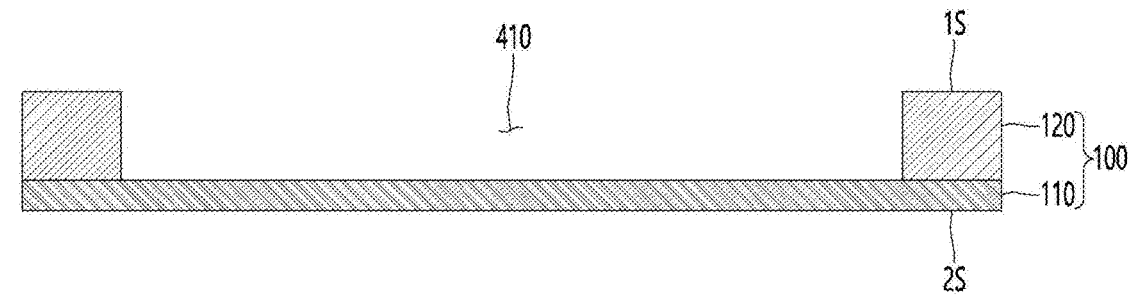

[FIG. 21]
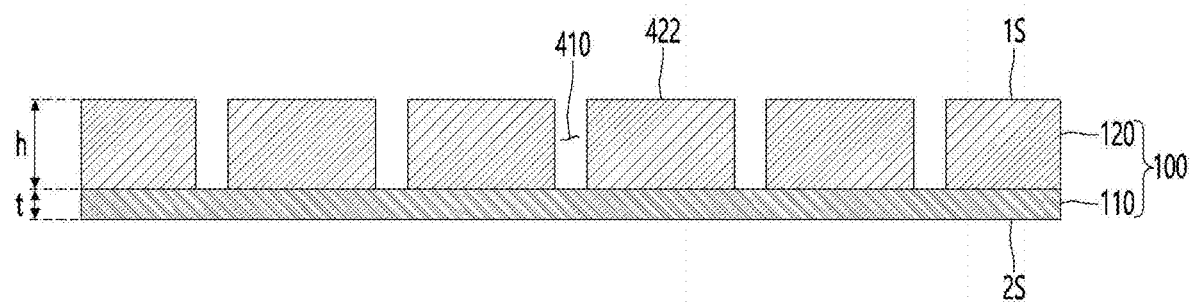

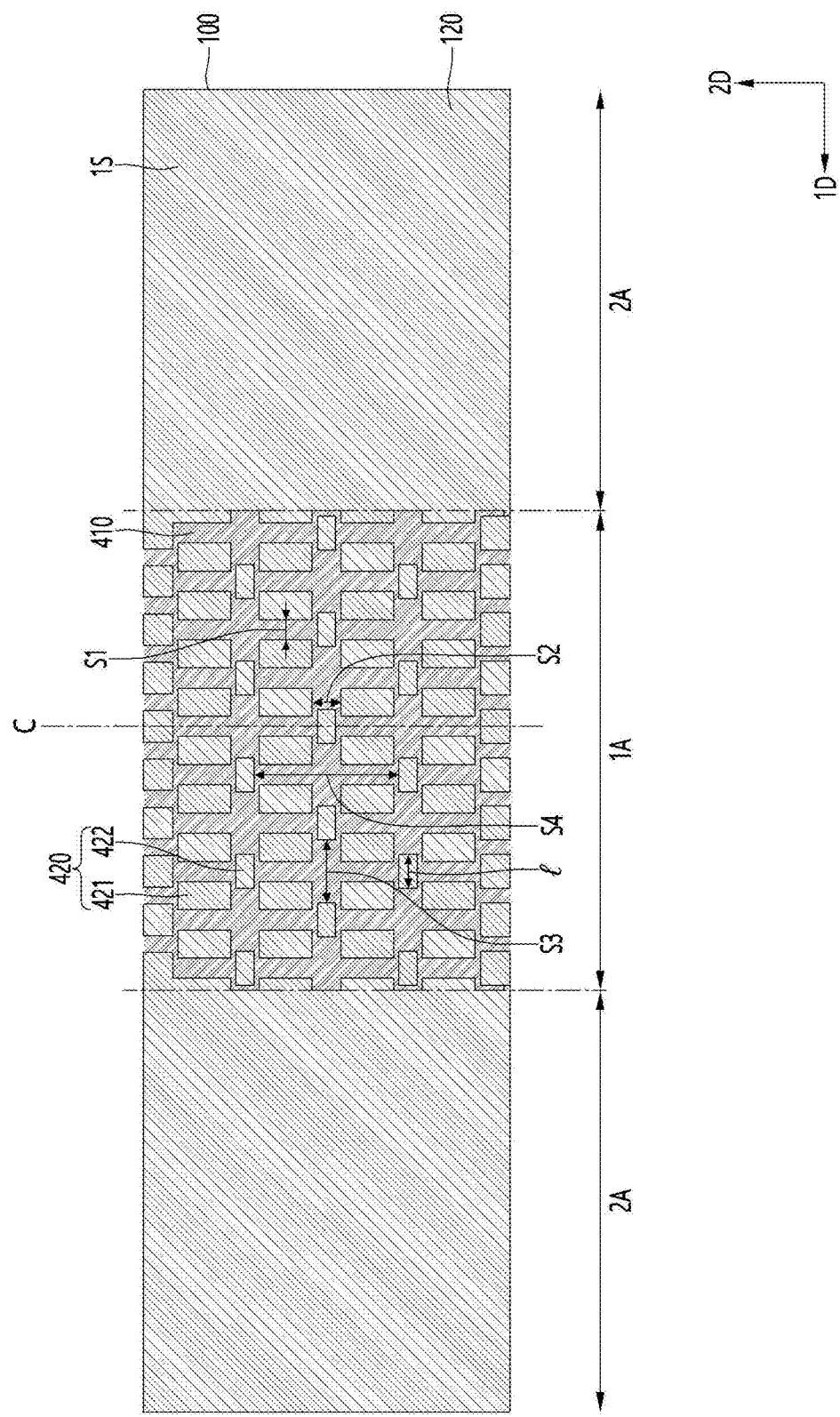
[FIG. 22]

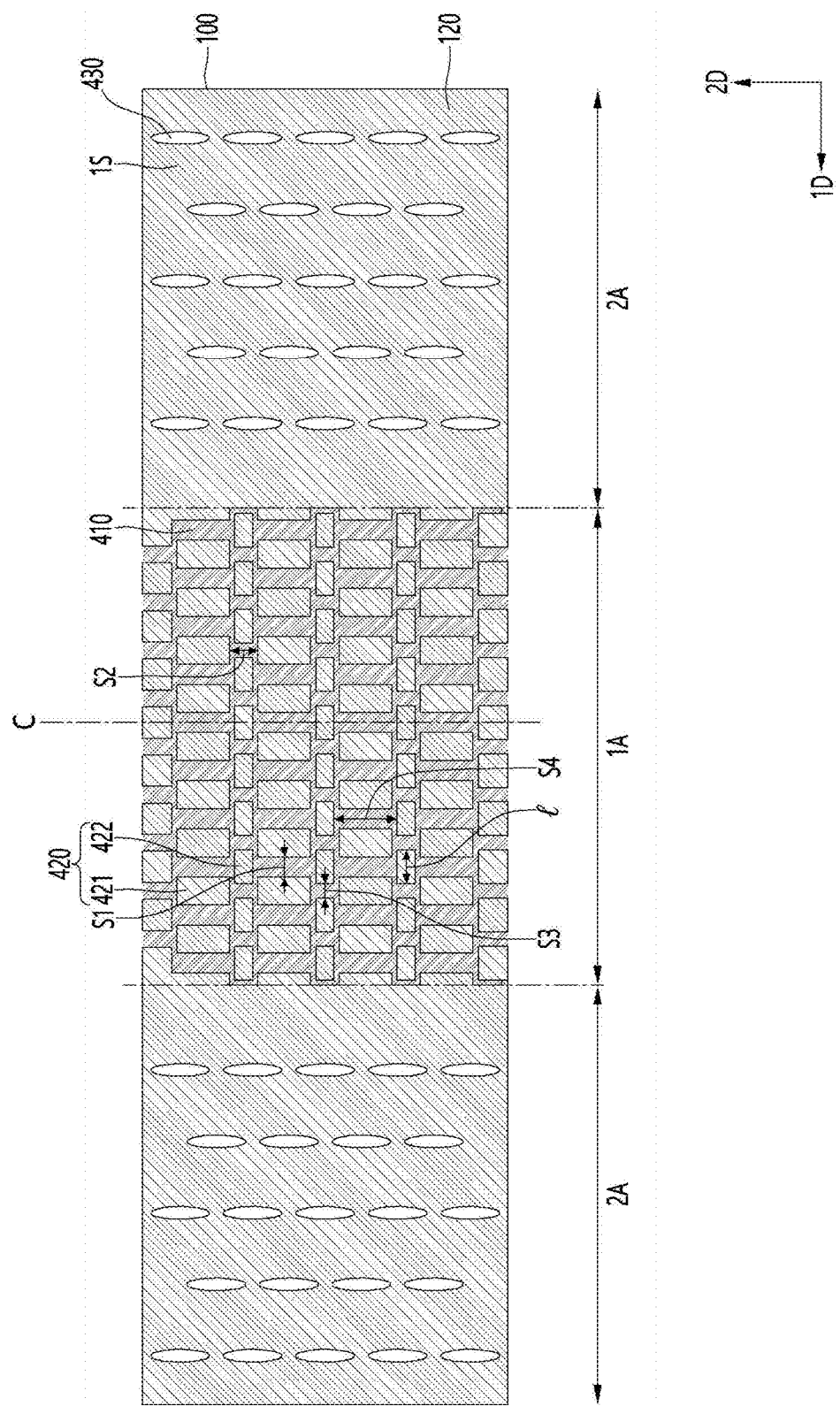
[FIG. 23]

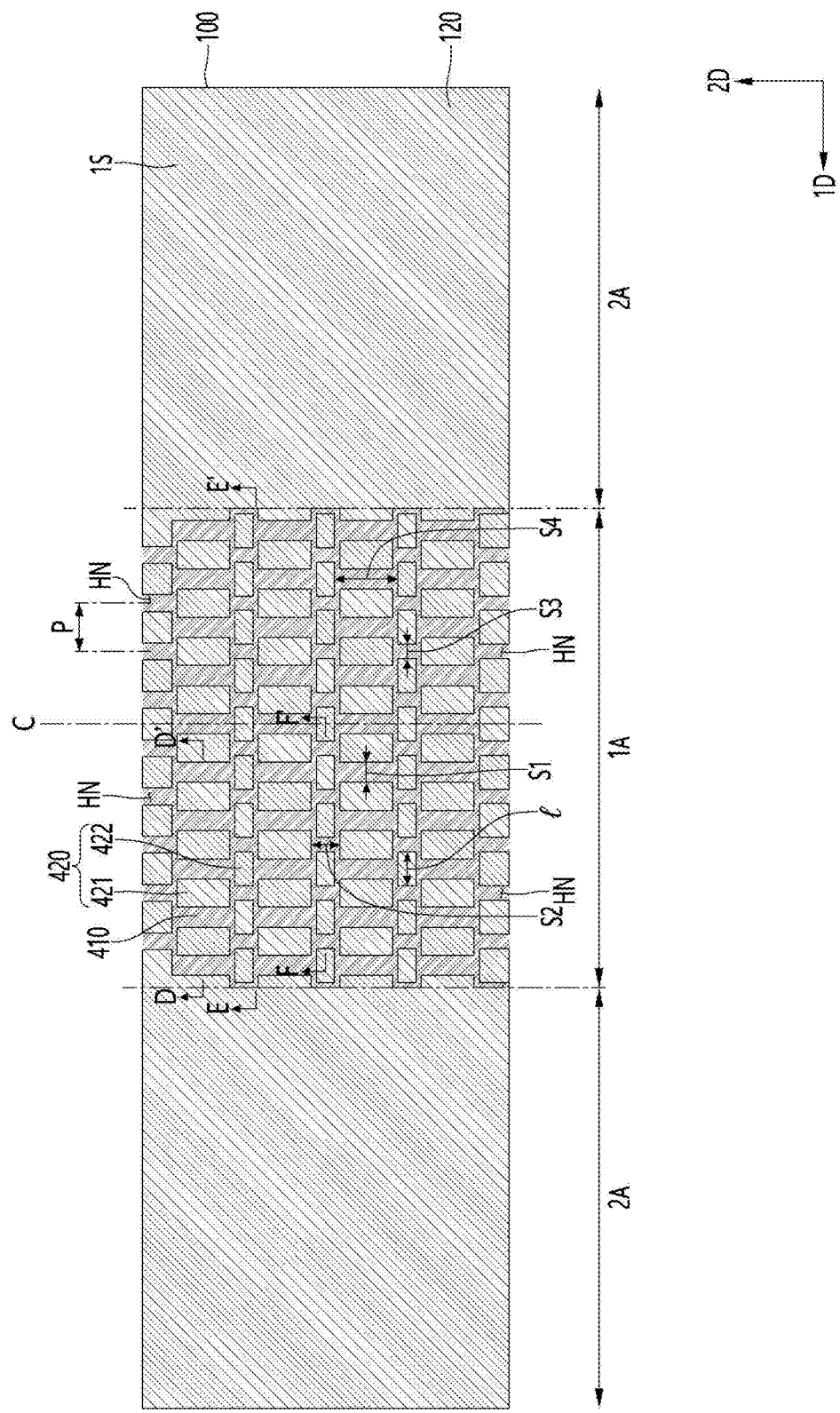
[FIG. 24]

[FIG. 25]
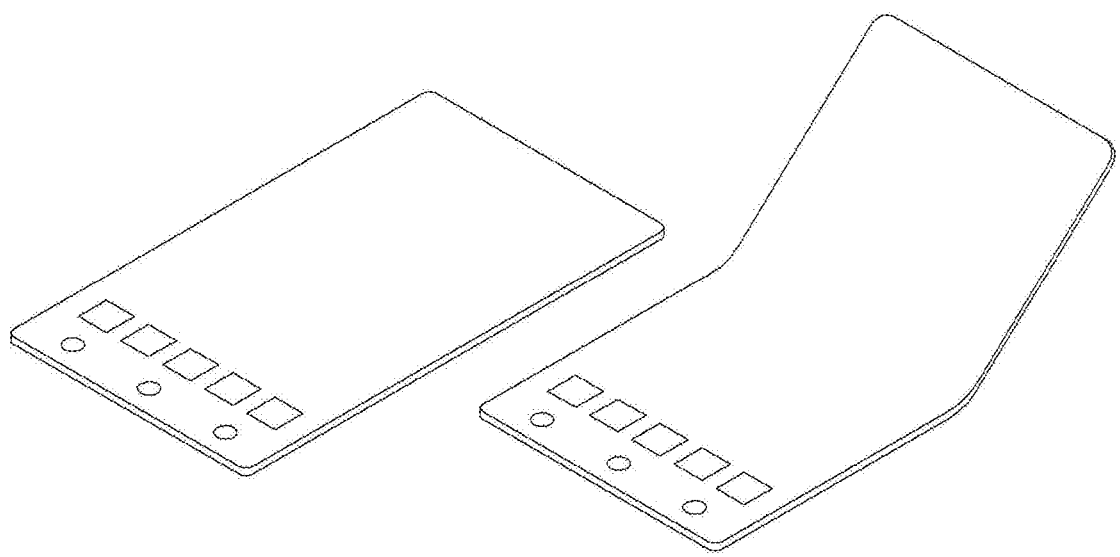

ELASTIC MEMBER

CROSS-REFERENCE TO RELATED PATENT APPLICATIONS

This application is a U.S. National Stage Application under 35 U.S.C. § 371 of PCT Application No. PCT/KR2021/004707, filed Apr. 14, 2021, which claims priority to Korean Patent Application Nos. 10-2020-0051010, filed Apr. 27, 2020 and 10-2020-0176498, filed Dec. 16, 2020, whose entire disclosures are hereby incorporated by reference.

TECHNICAL FIELD

The embodiment relates to an elastic member.

BACKGROUND ART

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display region may be increased, and a user may easily carry the display.

After the flexible or foldable display device is folded or bent, a restoration process of unfolding the flexible display device again may be repeated.

That is, since the flexible or foldable display device repeats folding and unfolding operations, the substrate of the flexible display device requires constant strength and elastic force, and cracks or deformation should not occur in the substrate during folding and restoration.

On the other hand, a display substrate, which is an elastic member constituting a flexible or foldable display device, generally uses a metal substrate.

Accordingly, the display substrate including the metal may be subjected to compressive and tensile stresses in the folding region while folding and unfolding are repeated, and accordingly, cracks may occur in the folding region when the elastic member is folded or unfolded. Folding reliability may be reduced.

In addition, stress generated when the elastic member is folded or unfolded is concentrated in a specific region to generate a hot spot region, and plastic deformation or cracks may occur in the elastic member in this region.

Therefore, there is a need for an elastic member having a new structure that can reduce stress for folding of the elastic member and prevent stress from being concentrated in a specific region during folding and original restoration.

DISCLOSURE

Technical Problem

An embodiment is directed to providing an elastic member capable of preventing cracks and deterioration of folding characteristics due to stress generated in the process of folding and restoring.

Technical Solution

An elastic member according to an embodiment includes a first surface and a second surface opposite to the first surface and a first region and a second region, wherein a first direction in a length direction and a second direction in a width direction are defined, the first region is defined as a folding region, and the second region is defined as an unfolding region, a first pattern portion having an intaglio shape and a second pattern portion having an embossed shape are formed in the first region, the second pattern portion includes a plurality of first patterns and a plurality of the second patterns that are spaced apart from each other, and a length of the first pattern extends in a second direction, and a length of the second pattern extends in the first direction.

Advantageous Effects

An elastic member according to an embodiment can improve the supporting characteristics and folding characteristics of the elastic member.

In detail, since a first pattern portion is formed by partially etching the elastic member without penetrating the elastic member, it is possible to facilitate folding of the elastic member and to minimize deterioration in support characteristics due to the formation of a pattern portion.

In addition, by disposing a second pattern portion capable of distributing a stress inside the first pattern portion in a direction parallel to a folding axis, it is possible to prevent the stress moving through the first pattern portion from being concentrated in a specific region of the elastic member.

Accordingly, it is possible to prevent the occurrence of cracks or warpage in the elastic member due to the concentration of the stress in a specific region of the elastic member.

In addition, in the elastic member according to the embodiment, the elastic member is formed of a plurality of layers, and accordingly, it is possible to improve both tensile properties and elastic properties of the elastic member.

That is, a first layer having good tensile properties is formed as a support layer of the elastic member, and a second layer having a small elastic modulus is disposed on the first layer as a reinforcing layer, so that a tensile strength and supporting force of the elastic member are sufficiently provided by the first layer, and it is possible to secure sufficient elastic force by facilitating the deformation of the elastic member through the second layer, Therefore, the elastic member according to the embodiment may secure the elastic force together with the tensile properties of the elastic member, and thus may have improved the folding characteristics.

In addition, in the elastic member according to the embodiment, the elastic member is formed of a plurality of layers, and accordingly, it is possible to easily control a depth of the elastic member pattern portion and a thickness of a remaining elastic member. That is, the elastic member is formed of a plurality of layers that react to different etchants, and thus it is possible to easily control the depth to which the pattern portion is to be formed and the thickness of the remaining elastic member.

DESCRIPTION OF DRAWINGS

FIG. 1 is a perspective view of a flexible display device according to an embodiment.

FIG. 2 is a perspective view of an elastic member according to an embodiment.

FIG. 3 is a side view before folding of the elastic member according to the embodiment.

FIG. 4 is a side view after folding of the elastic member according to the embodiment.

FIG. 5 is a top view of a first surface of an elastic member according to a first embodiment.

FIG. 6 is a top view of a second surface of the elastic member according to the first embodiment.

FIG. 7 is a cross-sectional view taken along line A-A' in FIG. 5.

FIG. 8 is another cross-sectional view taken along line A-A' in FIG. 5.

FIG. 9 is a cross-sectional view taken along line B-B' in FIG. 5.

FIG. 10 is a cross-sectional view taken along line C-C' in FIG. 5.

FIGS. 11 and 12 are views for describing a stress distribution of the elastic member according to the first embodiment.

FIG. 13 is another top view of the first surface of the elastic member according to the first embodiment.

FIG. 14 is still another top view of the first surface of the elastic member according to the first embodiment.

FIG. 15 is yet another top view of the first surface of the elastic member according to the first embodiment.

FIG. 16 is a top view of a first surface of an elastic member according to a second embodiment.

FIG. 17 is a top view of a second surface of the elastic member according to the second embodiment.

FIG. 18 is a cross-sectional view taken along line D-D' in FIG. 16.

FIG. 19 is another cross-sectional view taken along line D-D' in FIG. 16.

FIG. 20 is a cross-sectional view taken along line E-E' in FIG. 16.

FIG. 21 is a cross-sectional view taken along line F-F' in FIG. 16.

FIG. 22 is another top view of the first surface of the elastic member according to the second embodiment.

FIG. 23 is still another top view of the first surface of the elastic member according to the second embodiment.

FIG. 24 is yet another top view of the first surface of the elastic member according to the second embodiment.

FIG. 25 is a view for describing an application example of an elastic member according to embodiments.

MODES OF THE INVENTION

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and replaced. In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected" or "coupled" to another element, it may include not only when the element is directly "connected" or "coupled" to other elements, but also when the element is "connected" or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment will be described with reference to the drawings.

FIG. 1 is a perspective view of a display device including an elastic member according to an embodiment. The display device according to the embodiment may be a flexible display device or a foldable display device that may be bent in one direction.

Referring to FIG. 1, a display apparatus 1000 according to an embodiment may include an elastic member 100, a display panel 200 disposed on the elastic member 100, and a touch panel 300 disposed on the display panel 200.

The elastic member 100 may support the display panel 200 and the touch panel 300. That is, the elastic member 100 may be a support substrate supporting the display panel 200 and the touch panel 300.

The elastic member 100 may include a metal material. For example, the elastic member 100 may include metal, metal alloy, plastic, a composite material (e.g., carbon fiber reinforced plastic, a magnetic or conductive material, a glass fiber reinforced material, etc.), ceramic, sapphire, glass, and the like. The elastic member 100 may be formed as a single layer or as a multilayer including a plurality of layers.

The elastic member 100 may be flexible or foldable. That is, the elastic member 100 may be folded or bent in one direction. That is, the elastic member 100 may be a substrate for display applied to a flexible display device or a foldable display device.

The elastic member 100 may include at least two regions. In detail, the elastic member 100 may include a first region 1A and a second region 2A.

The first region 1A may be defined as a region where the elastic member 100 is folded. That is, the first region 1A may be a folding region.

In addition, the second region 2A may be defined as a region where the elastic member 100 is not folded. That is, the second region 2A may be an unfolding region.

The first region 1A and the second region 2A will be described in detail below.

The display panel 200 may be disposed on the elastic member 100.

The display panel 200 may include a plurality of pixels including a switching thin film transistor, a driving thin film transistor, a power storage device, and an organic light-emitting diode (OLED). In case of the organic light-emitting diode, deposition is possible at a relatively low temperature and may be mainly applied to the flexible display device for reasons of low power and high luminance. Here, the pixel refers to a minimum unit for displaying an image, and the display panel displays an image through the plurality of pixels.

The display panel may include a substrate, a gate line disposed on the substrate, a data line isolated from the gate line, and a common power line. In general, one pixel may be defined by the gate line, the data line, and the common power line as a boundary.

The substrate may include a material having flexible properties such as a plastic film, and the display panel 200 may be implemented by disposing an organic light-emitting diode and a pixel circuit on a flexible film.

The touch panel 300 may be disposed above the display panel 200. The touch panel 300 may implement a touch function in the foldable display device or the flexible display device, and the touch panel may be omitted in a foldable display device or a flexible display device that displays only an image without the touch function.

The touch panel 300 may include a substrate and a touch electrode disposed on the substrate. The touch electrode may sense a position of an input device touched by the foldable display device or the flexible display device by a capacitive type or a resistive type.

The substrate of the touch panel 300 may include a material having flexible properties such as a plastic film, and the touch panel 300 may be implemented by disposing the touch electrode on the flexible film.

Meanwhile, the elastic member 100 and the display panel 200 may have different sizes.

For example, an area of the elastic member 100 may be 90% or more to 110% or less of an area of the display panel 200. In detail, the area of the elastic member 100 may be 95% or more to 105% or less of the area of the display panel 200. In more detail, the area of the elastic member 100 may be 97% or more to 100% or less of the area of the display panel 200.

When the area of the elastic member 100 is 90% or less of the area of the display panel 200, support force of the elastic member 100 supporting the display panel 200 or the touch panel 300 is deteriorated, and thus a curl phenomenon or the like may occur in the unfolding region of the elastic member 100. Accordingly, when a user visually recognizes a screen region, visibility may be deteriorated, and when a touch is driven, a screen of a touch region may be incomplete due to a curled region, and thus a touch malfunction may occur.

In addition, when the area of the elastic member 100 increases to be 110% or more of the area of the display panel 200, the support force for supporting the display panel or the touch panel may be secured by the elastic member 100, but a bezel region of a display device including the substrate, the display panel, and the touch panel may increase. Accordingly, it is impossible to provide a wide effective screen region to the user, which may cause inconvenience in using the display device.

Meanwhile, although not shown in the drawings, a cover window protecting the foldable display device or the flexible display device may be additionally disposed above the touch panel 300 or above the display panel 200 (when the touch panel is omitted).

Meanwhile, the elastic member 100, the display panel 200, and the touch panel 300 may be adhered to each other through an adhesive layer or the like. In this case, when the elastic member 100 and the display panel 200 are adhered to each other, the adhesive layer is not disposed in the first region, i.e., the folding region, of the elastic member 100 and is disposed only in the second region, i.e., the unfolding region, to be adhered to each other. Alternatively, the adhesive layer may be disposed in both the first region and the second region.

As described above, the display device includes the elastic member 100.

Referring to FIG. 2, the elastic member 100 may be bent in one direction.

In detail, the elastic member 100 may include a first surface 1S and a second surface 2S opposite to the first surface 1S. In the elastic member 100, the first surface 1S or the second surface 2S may be bent to face each other. That is, the elastic member 100 may be bent so that the surfaces on which the panels are disposed face each other. Alternatively, the elastic member 100 may be bent so that a surface opposite to the surface on which the panels are disposed faces.

In the following description, as shown in FIG. 2, it will be mainly described that the elastic member 100 is bent in a direction in which the second surfaces 2S face each other.

As described above, the elastic member 100 may have the first region 1A and the second region 2A defined therein. The first region 1A and the second region 2A may be regions defined when the elastic member 100 is bent in the direction in which the second surfaces 2S face each other.

In detail, the elastic member 100 is bent in one direction, and the elastic member 100 may be divided into the first region 1A that is folded (folding region) and the second region 2A that is not folded (unfolding region).

Referring to FIG. 3 and FIG. 4, the elastic member 100 may include a first region 1A that is a region where the elastic member 100 is bent. In addition, the elastic member 100 may include a second region 2A that is not bent and is disposed adjacent to the first region 1A.

For example, the second region 2A may be formed on the left and right sides of the first region 1A, respectively, based on a bending direction of the elastic member 100. That is, the second region 2A may be disposed at both ends of the first region 1A. That is, the first region 1A may be disposed between the second regions 2A.

The first region 1A and the second region 2A may be formed on the same elastic member 100. That is, the first region 1A and the second region 2A may be formed integrally with each other without being separated from the same one elastic member 100.

Sizes of the first region 1A and the second region 2A may be different from each other. In detail, the size of the second region 2A may be greater than the size of the first region 1A.

In addition, an area of the first region 1A of the elastic member 100 may be 1% or more to 30% or less of an entire area of the elastic member 100. In detail, the area of the first region 1A of the elastic member 100 may be 5% or more to 20% or less of the entire area of the elastic member 100. The area of the first region 1A of the elastic member 100 may be 10% or more to 15% or less of the entire area of the elastic member 100.

When the area of the first region 1A of the elastic member 100 is 1% or less of the entire area of the elastic member 100, cracks may occur at the interface of the folding and unfolding regions of the elastic member 100 when the folding and restoring of the substrate is repeated, and thus folding reliability of the elastic member 1000 may be deteriorated.

In addition, when the area of the first region 1A of the elastic member 100 exceeds 30% of the entire area of the elastic member 100, curl may occur in the folding region of the display panel 200 when the substrate is folded. Accordingly, when the user visually recognizes the screen region, the visibility may be deteriorated, and when the touch is driven, the screen of the touch region may be incomplete due to the curled region, and thus the touch malfunction may occur.

In the drawings, it is illustrated that the first region 1A is positioned in a central portion of the elastic member 100, but the embodiment is not limited thereto. That is, the first region 1A may be positioned in one end and an end region of the elastic member 100. That is, the first region 1A may be positioned at one end and the end region of the elastic member 100 such that the size of the first region 1A is asymmetric.

FIG. 4 is a side view of the elastic member after the elastic member is folded.

Referring to FIG. 4, the elastic member 100 may be folded in one direction around the folding axis. In detail, the second surfaces 2S may be folded in a direction facing each other.

As the elastic member 100 is folded in one direction, the first region 1A and the second region 2A may be formed on the elastic member 100. That is, a folding region formed as the elastic member 100 is folded in one direction and an unfolding region positioned at both ends of the folding region may be formed on the elastic member 100.

The folding region may be defined as a region where a curvature R is formed, and the unfolding region may be defined as a region where the curvature R is not formed or the curvature is close to zero.

Referring to FIGS. 3 and 4, the elastic member 100 may be folded in one direction to be formed in an order of the unfolding region, the folding region, and the unfolding region.

A plurality of pattern portions may be formed in at least one of the first region 1A and the second region 2A in order to reduce and distribute stress generated when the elastic member 100 is folded. The pattern portions will be described in detail below.

Meanwhile, FIG. 4 illustrates that the second surfaces 2S of the elastic member 100 are folded to face each other, but the embodiment is not limited thereto, and the first surfaces 1S may be folded to face each other.

In detail, a folding surface of the elastic member may vary depending on a formation position of a pattern portion formed on the elastic member 100 to be described below.

That is, the elastic member 100 may be folded so that surfaces of the elastic member 100 on which pattern portions are not formed face each other.

Hereinafter, an elastic member according to various embodiments will be described in detail with reference to the drawings.

First, an elastic member according to a first embodiment will be described with reference to FIGS. 5 to 15.

FIGS. 5 and 6 are top views of a first surface and a second surface of the elastic member according to the first embodiment. That is, FIG. 5 is a top view of the first surface 1S of the elastic member, which is a folding outer surface, when the elastic member 100 is folded, and FIG. 6 is a top view of the second surface 2S of the elastic member, which is a folding inner surface, when the elastic member 100 is folded.

Referring to FIGS. 5 and 6, the elastic member 100 may include a plurality of pattern portions. In detail, a plurality of pattern portions may be disposed in the first region 1A of the elastic member 100. That is, the plurality of pattern portions may be disposed in the first region 1A defined as a folded region of the elastic member 100.

A pattern portion 400 may be disposed on at least one of the first surface 1S and the second surface 2S of the elastic member 100. In detail, when the elastic member 100 is folded, the pattern portion 400 may be disposed on the first surface 1S which is the folding outer surface of the elastic member 100.

The pattern portion 400 may include a plurality of pattern portions having different shapes. In detail, the pattern portion 400 may include a first pattern portion 410 and a second pattern portion 420 having different shapes.

Referring to FIGS. 7 to 9, the first pattern portion 410 may be formed by etching the elastic member 100. In detail, the first pattern portion 410 may be formed by partially etching the elastic member 100 from the first surface 1S toward the second surface 2S. That is, the first pattern portion 410 may be formed in an intaglio pattern. That is, the first pattern portion 410 may be a groove formed on the first surface 1S of the elastic member 100.

The drawings illustrate that the first pattern portion 410 is formed with a constant width in a depth direction, but the embodiment is not limited thereto, and an inner surface of the first pattern portion 410 may have a certain inclination angle so that the first pattern portion 410 is formed to be wider or narrower in width while extending in the depth direction of the first pattern portion 410 according to an etching method and time.

In addition, the drawings illustrate that an inner surface IS of the first pattern portion 410 is a flat surface, but the embodiment is not limited thereto, and the inner surface of the first pattern portion 410 may include a curved surface or may also have a surface roughness by a plurality of concavo-convex patterns or the like.

Accordingly, the first pattern portion 410 may include one or a plurality of side surfaces and a bottom surface BS connected to the side surface.

The bottom surface BS of the first pattern portion 410 may have various shapes.

Referring to FIG. 7, the bottom surface BS of the first pattern portion 410 may be formed as a flat surface. Alternatively, referring to FIG. 8, the bottom surface BS of the first pattern portion 410 may include a convex surface in the depth direction of the first pattern portion 410. That is, the bottom surface BS of the first pattern portion 410 may include a convex surface toward the second surface 2S of the elastic member.

In detail, the bottom surface BS of the first pattern portion 410 may be formed to have a radius of curvature of 0.1 mm or more. When the radius of curvature of the bottom surface BS of the first pattern portion 410 is less than 0.1 mm, a stress is concentrated inside a specific first pattern portion due to a thickness deviation according to a size of the curvature radius when the elastic member is folded, so that folding characteristics may be deteriorated.

A depth d of the first pattern portion 410 may vary depending on a thickness of the elastic member 100. In addition, the depth d of the first pattern portion 410 may vary depending on a degree to which the elastic member 100 is folded, that is, a radius of curvature of the folded elastic member 100. Here, the depth d of the first pattern portion 410 may be defined as a maximum distance from the bottom surface BS of the first pattern portion 410 to the first surface 1S of the elastic member 100.

In addition, a thickness t of the first pattern portion 410 may vary depending on a degree to which the elastic member 100 is folded, that is, a radius of curvature of the elastic member 100 after folding. The thickness t of the first pattern portion 410 may vary depending on the depth of the first pattern portion 410. The thickness t of the first pattern portion 410 may be defined as a thickness of the elastic member 100 remaining after the first pattern portion 410 is formed on the first surface 1S of the elastic member. That is, the thickness t of the first pattern portion 410 may be defined as a distance from the bottom surface BS of the first pattern portion 410 to the second surface 2S of the elastic member 100. In detail, the thickness t of the first pattern portion 410 may be defined as a maximum distance from the bottom surface BS of the first pattern portion 410 to the second surface 2S of the elastic member 100.

In detail, when the elastic member 100 is folded so that the radius of curvature of the elastic member 100 is 5 mm or less, the thickness t of the first pattern portion 410 may be 50 µm or less.

In detail, when the elastic member 100 is folded so that the radius of curvature is greater than 0.5 mm and 5 mm or less, the thickness t of the first pattern portion 410 may be 50 µm or less.

In more detail, when the elastic member 100 is folded so that the radius of curvature is greater than 0.5 mm and 5 mm or less, the thickness t of the first pattern portion 410 may be 5 µm to 50 µm.

When the thickness t of the first pattern portion 410 is formed to be less than 5 µm in the radius of curvature of the elastic member 100, an elastic force of the elastic member is reduced due to a decrease in the thickness of the first pattern portion 410, and thus a restoring force restored after folding may be reduced and a supporting force for supporting the display panel disposed on the elastic member 100 may be reduced.

In addition, when the thickness t of the first pattern portion 410 is formed to be greater than 50 µm in the radius of curvature of the elastic member 100, plastic deformation occurs in the first region 1A, which is the folding region, due to an increase in the thickness of the first pattern portion 410 after folding, and thus the folding characteristics may be deteriorated.

The elastic member 100 may include a plurality of directions. In detail, the elastic member 100 may include a first direction 1D, a second direction 2D, and a third direction.

In detail, the elastic member 100 may extend in the first direction 1D corresponding to a length or width direction of the elastic member 100 and in a direction different from the first direction 1D, may extend in the second direction 2D corresponding to the length or width direction of the elastic member 100 and in a direction different from the first direction 1D and the second direction 2D, and may include a third direction corresponding to a thickness direction of the elastic member 100.

For example, the first direction 1D may be defined as the length direction of the elastic member 100, and the second direction 2D may be defined as the width direction of the elastic member 100 perpendicular to the first direction 1D, and the third direction may be defined as the thickness direction of the elastic member 100.

Alternatively, the first direction 1D may be defined as the width direction of the elastic member 100, and the second direction 2D may be defined as the length direction of the elastic member 100 perpendicular to the first direction 1D, and the third direction may be defined as the thickness direction of the elastic member 100.

Hereinafter, for convenience of description, the first direction 1D will be described in the length direction of the elastic member 100, the second direction 2D will be described in the width direction of the elastic member 100, and the third direction will be described in the thickness direction of the elastic member 100.

The first pattern portion 410 may be disposed to extend in a plurality of directions.

In detail, the first pattern portion 410 may extend in the first direction 1D corresponding to the length direction of the elastic member 100 and the second direction 2D corresponding to the width direction of the elastic member 100. That is, the first pattern portion 410 may extend in the first direction 1D corresponding to a long side direction of the elastic member 100 in the first region 1A of the elastic member 100 and in the second direction 2D corresponding to a short side direction of the elastic member 100.

A first pattern portion 410 extending in the first direction 1D and a first pattern portion 410 extending in the second direction 2D may extend in a direction crossing each other. The first pattern portion 410 extending in the first direction 1D and the first pattern portion 410 extending in the second direction 2D may be connected to each other. Accordingly, the first pattern portion 410 extending in the first direction 1D and the first pattern portion 410 extending in the second direction 2D may be integrally formed while extending in the direction crossing each other.

Referring to FIGS. 5 to 10, the second pattern portion 420 may be defined as an unetched region of the elastic member 100 unlike the first pattern portion 410 which is an etched region formed in the first region 1A.

That is, the second pattern portion 420 may be an embossed pattern remaining in the first region 1A after the first pattern portion 410, which is the intaglio pattern, is formed. Accordingly, an upper surface of the second pattern portion 420 may be disposed on the same plane as the first surface 1S of the elastic member 100.

The second pattern portion 420 may include a plurality of second pattern portions. In detail, the second pattern portion 420 may include the plurality of second pattern portions spaced apart from each other. That is, the second pattern portions 420 may be dispose to be spaced apart from each other by a size of the first pattern portions 410 by the first pattern portions 410 disposed between adjacent second pattern portions 420.

A height h of the second pattern portion 420 may be defined as a distance from the bottom surface BS of the first pattern portion 410 to the first surface 1S of the elastic member.

That is, the height h of the second pattern portion 420 may be the same as or similar to the depth d of the first pattern portion 410.

In addition, the height h of the plurality of second pattern portions 420 may have a uniform height. In detail, a difference in height h between the plurality of second pattern portions 420 may be 3% or less. In more detail, the difference in height h between the plurality of second pattern portions 420 may be 1% to 3%.

When the difference in height h of the plurality of second pattern portions 420 exceeds 3%, a difference in depth d of the first pattern portions 410 disposed between the second pattern portions 420 increases, so that the thickness non-uniformity of the first pattern portion 410 may occur. Accordingly, a difference in a degree in which stress is distributed occurs depending on each region of the first pattern portions 410, and accordingly, the elastic member 100 may be bent and reliability may be deteriorated.

The second pattern portion 420 may include a plurality of second pattern portions having different shapes. In detail, the second pattern portion 420 may include a first pattern 421 and a second pattern 422 having different shapes.

Meanwhile, the drawings illustrate that the second pattern portion 420 is formed in a quadrangular shape, but the embodiment is not limited thereto, and the second pattern portion 420 may be formed in a circle shape having a curved surface or various polygonal shapes such as a triangle, a pentagon, a hexagon, etc.

In addition, both the first pattern 421 and the second pattern 422 may be formed in a quadrangular shape, or any one of the first pattern 421 and the second pattern 422 may be formed in a circular shape, and the other pattern may be formed in a polygonal shape, or any one of the first pattern 421 and the second pattern 422 may be formed in a polygonal shape, and the other pattern may be formed in a polygonal shape different from any one pattern portion.

The first pattern 421 may be disposed to be spaced apart from each other in the first direction 1D and the second direction 2D. That is, the first pattern 421 may be disposed to be spaced apart from each other while extending in the length direction and the width direction of the elastic member 100.

Accordingly, the first pattern 421 may have a first interval s1 in the first direction 1D and a second interval s2 in the second direction 2D.

In addition, the second pattern 422 may be disposed to be spaced apart from each other in the first direction 1D and the second direction 2D. That is, the second pattern 422 may be disposed to be spaced apart from each other while extending in the length direction and the width direction of the elastic member 100.

Accordingly, the second pattern 422 may have a third interval s3 in the first direction 1D and a fourth interval s4 in the second direction 2D. In this case, the fourth interval s4 may be formed to be greater than the third interval s3.

By forming the fourth interval s4 greater than the third interval s3, folding of the elastic member 100 may be facilitated, and stress caused by folding may be reduced.

The first pattern 421 may be formed in a form extending in one direction. In detail, a length of the first pattern 421 may extend in the second direction 2D, and a width of the first pattern 421 may extend in the first direction 1D. That is, the first pattern 421 may have a long side formed in the second direction 2D and a short side formed in the first direction 1D.

Accordingly, when the elastic member 100 is folded or restored in a direction of the folding axis, plastic deformation of the elastic member 100 may be minimized.

The first pattern 421 may serve to fold the elastic member 100 together with the first pattern portion 410. That is, the elastic member 100 may reduce a thickness of the first region folded in the elastic member 100 by the first pattern portion 410 and the first pattern 421. Accordingly, in the elastic member 100, a stress generation region generated when the elastic member is folded may be reduced. That is, by reducing the thickness of the elastic member proportional to compressive stress in the first region 1A which is the folding region of the elastic member, compressive stress generated when the elastic member is folded may be reduced.

That is, since the thickness of the elastic member 100 is reduced by the first pattern portion 410 and the first pattern 421 in the region where the elastic member 100 is folded, thereby reducing the compressive stress, it is possible to prevent the elastic member 100 from being deformed by folding stress.

The second pattern 422 may serve to distribute tensile stress. In detail, when the folding of the elastic member 100 is repeated, tensile stress may be generated in the elastic member. When the tensile stress is concentrated in a specific region, cracks or deformation such as bending may occur in the elastic member 100.

Accordingly, the second pattern 422 may be disposed between the first pattern portions 410, that is, at an appropriate position in the first pattern portion 410, to control movement of the tensile stress. Accordingly, it is possible to prevent bending or cracking of the elastic member 100 due to concentration of the tensile stress in a specific region when the elastic member 100 is folded.

To this end, the second pattern 422 may be disposed between the first patterns 421. That is, the second pattern 422 may be spaced apart from the first pattern 421 and disposed between the first patterns 421.

In detail, a plurality of second patterns 422 may be disposed to extend in the first direction 1D while being spaced apart from each other between the first patterns 421 spaced apart from each other in the second direction 2D. That is, the plurality of second patterns 422 may be disposed to extend in the first direction 1D within the second interval s2 of the first pattern 421 spaced apart in the second direction 2D.

Through this, by preventing tensile stress generated in a direction perpendicular to a folding axis C of the elastic member 100 when the elastic member 100 is folded from being concentrated in one region, it is possible to prevent bending or cracking of the elastic member 100.

In addition, the plurality of second patterns 422 may be disposed to extend in the first direction. In detail, the plurality of second patterns 422 may be disposed at a position overlapping the folding axis C of the elastic member 100 between the first patterns 421 spaced apart from each other in the second direction. In addition, the second pattern 422 may be disposed to overlap a plurality of imaginary lines parallel to the folding axis C of the elastic member 100.

Accordingly, when the elastic member is folded along the folding axis C, tensile stress moving through the first pattern portion 410 extending along the folding axis may be controlled by the second pattern 422. Therefore, it is possible to prevent stress from being concentrated in a specific region of the elastic member.

A length l of the second pattern 422 may be the same as or different from the first interval s1 of the first pattern 421. That is, both ends of the second pattern 422 in the first direction may overlap both ends of the first interval s1 of the first pattern 421 or may be disposed inside or outside the first pattern 421.

That is, the length l of the second pattern 422 in the first direction 1D may be the same as or different from a size of the first interval s1. That is, the length l of the second pattern 422 in the first direction 1D may be the same as, smaller than, or greater than the size of the first interval s1.

For example, the length l of the second pattern 422 may be equal to or less than twice a pitch p of the first patterns 421 in the first direction.

When the length l of the second pattern 422 is equal to or greater than the first interval s1 of the first pattern 421, the tensile stress moving along the folding axis may be effectively distributed by the second pattern 422, and thus it is possible to prevent stress from being concentrated on a side surface of the second pattern 422. Accordingly, it is possible to prevent cracks in a lateral direction of the second pattern 422.

In addition, when the length l of the second pattern 422 is smaller than the first interval s1 of the first pattern 421, the overall folding elastic force of the elastic member may be reduced due to a decrease in an area of the first pattern 421, but it is possible to effectively distribute the stress generated in the folding region of the elastic member, thereby preventing the stress from being concentrated in a specific region of the folding region. Accordingly, it is possible to prevent cracks in the folding region of the elastic member.

FIGS. 11 and 12 are views for describing a stress distribution of the elastic member along the length l of the second pattern 422. In detail, FIGS. 11 and 12 are views for describing the stress distribution of the elastic member along the length l of the second pattern 422 when the elastic member is folded with a radius of curvature of 1.5 mm.

FIG. 11 is a view illustrating the stress distribution of the elastic member when the length l of the second pattern 422 is greater than the first interval s1 of the first pattern 421, and FIG. 12 is a view illustrating the stress distribution of the elastic member when the length l of the second pattern 422 is smaller than the first interval s1 of the first pattern 421.

Referring to FIG. 11, the elastic member may effectively distribute the tensile stress moving along the folding axis by the second pattern 422, and thus the concentration of stress to the side surface of the second pattern 422 may be minimized.

In addition, referring to FIG. 12, the elastic member may reduce a magnitude of stress generated in the folding region compared to FIG. 11. That is, it is possible to more effectively distribute the stress in the folding region, thereby preventing the stress from being concentrated in a specific region of the folding region.

Table 1 below describes a magnitude of stress according to the length l of the second pattern 422, the width w of the second pattern 422, and the size of the first interval s1 of the first pattern 421.

TABLE 1

| | First interval (s1) | Width (w) | Length (l) | Maximum stress in the first pattern portion (MPa) | Maximum stress in the second pattern portion (MPa) |
| --- | --- | --- | --- | --- | --- |
| Example 1 | 200 | 600 | 300 | 2216.6 | 866.4 |
| Example 2 | 400 | 300 | 300 | 1340.8 | 198.68 |

Referring to Table 1, when the length l of the second pattern 422 is smaller than the first interval s1 of the first pattern 421 (Example 2), in comparison with a case in which the length l is greater than the first interval s1 (Example 1), it can be seen that a magnitude of stress of the first pattern portion which is the etched region and the second pattern portion which is the unetched region of the elastic member is small. That is, when the length l of the second pattern 422 is greater than the first interval s1 of the first pattern 421, it can be seen that the stress in the folding region may be reduced. That is, by changing the length l of the second pattern or the first interval s1 of the first pattern 421, it is possible to prevent cracks in the second pattern of the elastic member or prevent the concentration of stress in the folding region of the elastic member.

In addition, when the length l of the second pattern 422 exceeds twice the pitch p of the first patterns 421, plastic deformation occurs in the second pattern 422 after folding the elastic member 100 due to a size of the second pattern 422, and thus the folding characteristics of the elastic member may be deteriorated, and the elastic member may not be restored after folding.

Meanwhile, referring to FIG. 13, the second pattern 422 may be disposed in a zigzag manner in the second direction 2D of the elastic member 100.

In detail, the third interval s3 of the second pattern 422 disposed to be spaced apart from each other in the first direction of the elastic member 100 may be smaller than the fourth interval s4 disposed to be spaced apart from each other in the second direction. In addition, the length l of the second pattern 422 in the first direction may be smaller than the third interval s3 of the adjacent second pattern 422.

By disposing the second pattern 422 in the zigzag manner, a total area of the second pattern 422 disposed on the elastic member 100 may be reduced. Accordingly, by reducing the number of the second patterns 422 that are not etched in the first region 1A which is the folding region of the elastic member 100, a magnitude of the compressive stress proportional to the thickness in the first region 1A may be reduced. Accordingly, the elastic member 100 may be easily folded.

In addition, when the elastic member 100 is restored after folding, it may be easily restored by reducing the tensile stress of the elastic member, and at the same time, it is possible to improve folding reliability by preventing the tensile stress from being concentrated in a specific region due to the arrangement of the second pattern 422.

The elastic member according to the first embodiment may improve the supporting characteristics and folding characteristics of the elastic member.

In detail, since the first pattern portion is formed by partially etching the elastic member without penetrating the elastic member, it is possible to facilitate folding of the elastic member, and at the same time, to minimize deterioration in supporting characteristics due to the formation of the pattern portion.

In addition, by disposing the second pattern portion capable of distributing stress inside the first pattern portion in a direction parallel to the folding axis, it is possible to prevent the stress moving through the first pattern portion from being concentrated in a specific region of the elastic member.

Accordingly, it is possible to prevent an occurrence of cracks or bending in the elastic member due to the concentration of stress in a specific region of the elastic member.

FIG. 14 is another top view of the first surface of the elastic member according to the first embodiment.

Referring to FIG. 14, in the elastic member 100, a plurality of pattern portions may also be formed in the second region 2A of the elastic member 100. In detail, a plurality of third pattern portions 430 spaced apart from each other may be disposed in the second region 2A of the elastic member 100.

The third pattern portion 430 may be formed as a hole or a groove. In detail, similar to the first pattern portion 410, the third pattern portion 430 may be formed an intaglio pattern in which the second region 2A of the first surface 1S of the elastic member 100 is partially etched.

Alternatively, unlike the first pattern portion 410, the third pattern portion 430 may be formed in a hole shape formed to penetrate the first surface 1S and the second surface 2S of the elastic member 100.

A difference in deformation due to heat in the first region 1A in which the first pattern portion 410 is formed and the second region 2A in which the third pattern portion 430 is formed may be reduced by the third pattern portion 430 formed in the second region 2A.

In detail, by forming a pattern portion formed by partially or entirely etching the elastic member in both the first region 1A and the second region 2A, a difference between the deformation due to the heat in the first region 1A and the deformation due to the heat in the second region 2A may be relieved. Therefore, it is possible to prevent the elastic member from being bent or twisted.

In addition, it is possible to prevent bending of the elastic member by relieving unevenness of the stress between the first region 1A and the second region 2A by the third pattern portion 430 formed in the second region 2A.

In addition, when a panel or the like is adhered to the elastic member 100 through an adhesive layer, an adhesive material is disposed to fill the inside of the first pattern portion and the third pattern portion by the third pattern portion 430 formed in the second region 2A, and thus it is possible to prevent the adhesive layer from forming a step difference between the first region and the second region.

The third pattern portion 430 may be formed in a regular pattern in the second region 2A. Alternatively, the third pattern portion 430 may be formed in an irregular pattern in the second region 2A. For example, the third pattern portion 430 may be formed in different shapes, or the third pattern portion 430 may be disposed in a zigzag position between adjacent columns.

The third pattern portion 430 may be formed to have a curved surface. In detail, the third pattern portion 430 may be formed in a shape having a curved surface such as an elliptical shape, a hemispherical shape, or a circular shape.

However, the embodiment is not limited thereto, and the third pattern portion 430 may be formed in a polygonal shape such as a triangle or a quadrangle, or may include a curved surface and a polygonal shape together.

In addition, as the third pattern portion approaches the first region, a density of the third pattern portion 430 may be formed to be high. That is, as the third pattern portion approaches the first region, a distance of the third pattern portion 430 decreases, or as the third pattern portion approaches the first region, the density of the third pattern portion 430 may be formed to be high by increasing a size of the third pattern portion 430.

Through this, the difference between the deformation due to the heat in the first region 1A and the deformation due to heat in the second region 1A may be further relieved.

FIG. 15 is another top view of the first surface of the elastic member according to the first embodiment.

Referring to FIG. 15, the elastic member 100 may further include a hinge portion.

For example, the first region 1A and the second region 2A may be distinguished according to whether the hinge portion is formed. That is, the folding region and the unfolding region may be divided according to whether the hinge portion is formed.

In detail, a plurality of hinge portions may be formed in the first region 1A, and the hinge portions may not be formed in the second region 2A.

That is, the folding region may be defined as a region in which a hinge portion HN is formed.

The hinge portion HN may be defined as a point at which folding starts in the elastic member 100. That is, in the elastic member, folding may start from hinge portions at both ends of the plurality of hinge portions. The hinge portion HN may facilitate folding of the elastic member 100.

The hinge portion HN may include the plurality of hinge portions according to a folding shape of the elastic member 100. The hinge portion HN may be formed at both ends of the elastic member 100 based on a length of a transverse direction that is the width direction of the elastic member 100. That is, the hinge portion HN may be formed at both ends of the elastic member 100 defining the folding axis of the elastic member 100.

Accordingly, when the elastic member 100 for the display is folded, the folding region may be easily folded by the hinge portion HN.

The hinge portion HN may be formed by penetrating the first and second surfaces of a region of the transverse direction among the end regions of the elastic member 100. That is, the hinge portion HN may be defined as a hole in which both end regions of the transverse direction among the end regions of the elastic member 100 are formed to be penetrated.

The hinge portion HN may be formed to have a flat surface or a curved surface. In detail, the hinge portion may be formed in a shape having a curved surface such as an elliptical shape, a hemispherical shape, or a circular shape.

However, the embodiment is not limited thereto, and the hinge portion may be formed in the elliptical shape or a polygonal shape such as a triangle or a quadrangle.

In addition, the hinge portion HN may be formed to have a size different from sizes of the first pattern portion and the third pattern portion described above. In detail, the hinge portion HN may be formed to have a size smaller than the sizes of the first pattern portion and the third pattern portion.

Hereinafter, an elastic member according to a second embodiment will be described with reference to FIGS. 16 to 24. In the description of the elastic member according to the second embodiment, descriptions of the same as or similar to those of the elastic member according to the first embodiment described above will be omitted, and the same reference numerals will be assigned to the same components.

Referring to FIGS. 16 to 24, the elastic member according to the second embodiment may include a plurality of layers. In detail, the elastic member according to the second embodiment may include a plurality of metal layers.

For example, the elastic member 100 may include a first layer 110 and a second layer 120 disposed on the first layer 110.

The first layer 110 and the second layer 120 may have different physical properties. In detail, the first layer 110 and the second layer 120 may have different tensile strengths. In addition, the first layer 110 and the second layer 120 may have different elastic moduli.

For example, a tensile strength of the first layer 110 may be greater than a tensile strength of the second layer 120. Accordingly, with respect to a tensile stress generated when the elastic member 110 is folded or unfolded again, the first layer 110 may withstand a tensile stress greater than that of the second layer 120. That is, in the elastic member 100, the strength of the elastic member may be improved by the first layer 110.

In addition, an elastic modulus of the first layer 110 may be greater than that of the second layer 120. Accordingly, the second layer 120 of the elastic member 100 may receive less stress transmitted in accordance with a change rate of each layer that changes when the elastic member 110 is folded or unfolded again than the first layer 110. That is, since the second layer 120 has an elastic modulus smaller than that the first layer 110, it is possible to have an improved tensile rate, i.e., a change rate, and thus a change in a shape of the elastic member 100 may be easily implemented. That is, in the elastic member 100, the elastic force of the elastic member may be improved by the second layer 120.

The first layer 110 and the second layer 120 may include various metals satisfying the physical conditions. For example, the first layer 110 may include stainless steel (sus), and the second layer 120 may include copper (Cu).

In addition, the first layer 110 and the second layer 120 may have different etching characteristics. In detail, the first layer 110 and the second layer 120 may be etched by different etchants. Accordingly, the second layer may not be etched by an etchant that etches the first layer, and the first layer may not be etched by an etchant that etches the second layer.

Therefore, when the pattern portion is formed on the elastic member 100, a depth of the pattern portion and a thickness of a remaining elastic member may be easily controlled. That is, by forming the elastic member in a plurality of layers that respond to different etchants, a depth to be implemented of the pattern portion and the thickness of the remaining elastic member may be easily controlled.

The first layer 110 and the second layer 120 may be formed to have different thicknesses. In detail, a thickness of the first layer 110 may be smaller than a thickness of the second layer 120.

For example, the thickness of the first layer 110 may be 5 μm to 50 μm. In addition, the thickness of the second layer 120 may be 10 μm to 200 μm.

When the thickness of the first layer 110 is less than 5 μm, the supporting force and a tensile strength of the elastic member may be reduced, and when the thickness of the first layer 110 exceeds 50 μm, a stress of the first layer 110 increases, so that plastic deformation occurs in the elastic member during folding, and thus the folding characteristics may be deteriorated.

When the thickness of the second layer 120 is less than 10 μm, the elastic force of the elastic member may not be sufficiently secured, and when the thickness of the second layer 120 exceeds 200 μm, the second layer 120, the stress generated when the elastic member is folded increases due to an increase in the thickness of the second layer 120, and thus the folding characteristics may be deteriorated.

Referring to FIG. 16, the elastic member 100 may include a plurality of pattern portions. In detail, the plurality of pattern portions may be disposed in the first region 1A of the elastic member 100. That is, the plurality of pattern portions may be disposed in the first region 1A defined as a folded region of the elastic member 100.

The pattern portion 400 may be disposed on at least one of the first surface 1S and the second surface 2S of the elastic member 100. In detail, when the elastic member 100 is folded, the pattern portion 400 may be disposed on the folding outer surface of the elastic member 100.

In detail, the pattern portion 400 may be disposed on the first layer 110 or the second layer 120 of the elastic member 100. In more detail, the pattern portion 400 may be formed on one surface of the second layer 120 in order to secure the elastic force and the folding reliability of the elastic member 100.

The pattern portion may include a plurality of pattern portions having different shapes from each other. In detail, the pattern portion may include a first pattern portion 410 and a second pattern portion 420 having different shapes from each other.

Referring to FIGS. 17 to 20, the first pattern portion 410 may be formed by etching the elastic member 100. In detail, the first pattern portion 410 may be formed by partially etching the elastic member 100. That is, the first pattern portion 410 may be formed in an intaglio pattern. That is, the first pattern portion 410 may be a groove formed on the first surface 1S of the elastic member 100.

In detail, the first pattern portion 410 may be disposed on one surface of the second layer 120 among layers of the elastic member 100. That is, the first pattern portion 410 may be formed to completely or partially penetrate the second layer 120 of the elastic member.

For example, referring to FIG. 18, the first pattern portion 410 may be formed to penetrate the second layer 120 as a whole. Accordingly, the bottom surface BS and the inner surface IS of the first pattern portion 410 may include different materials. In detail, the bottom surface BS of the first pattern portion 410 may include a material of the first layer 110, and the inner surface IS of the first pattern portion 410 may include a material of the second layer 120.

Alternatively, although not shown in the drawing, the first pattern portion 410 may be formed to partially penetrate the second layer 120. Accordingly, the bottom surface BS and the inner surface IS of the first pattern portion 410 may include the same material. In detail, the bottom surface BS and the inner surface IS of the first pattern portion 410 may include the material of the second layer 120.

Hereinafter, a case in which the first pattern portion 410 is formed to completely penetrate the second layer 120 will be mainly described.

The drawing illustrates that the first pattern portion 410 is formed with a constant width in the depth direction, but the embodiment is not limited thereto, and the inner surface of the first pattern portion 410 may have a certain inclination angle so that the first pattern portion 410 is formed to be wider or narrower in width while extending in the depth direction of the first pattern portion 410 according to an etching method and time.

In addition, the drawings illustrate that an inner surface IS of the first pattern portion 410 is a flat surface, but the embodiment is not limited thereto, and the inner surface of the first pattern portion 410 may include a curved surface or may also have a surface roughness by a plurality of concavo-convex patterns or the like.

In addition, the bottom surface BS of the first pattern portion 410 may have various shapes.

Referring to FIG. 18, the bottom surface BS of the first pattern portion 410 may be formed as a flat surface. Alternatively, referring to FIG. 19, the bottom surface BS of the first pattern portion 410 may include a convex surface in the depth direction of the first pattern portion 410.

In detail, the bottom surface BS of the first pattern portion 410 may be formed to have a radius of curvature of 0.1 mm or more. When the radius of curvature of the bottom surface BS of the first pattern portion 410 is less than 0.1 mm, when the elastic member is folded, stress is concentrated inside a specific first pattern portion due to a thickness deviation according to a size of the curvature radius, so that folding characteristics may be deteriorated.

A depth d of the first pattern portion 410 may vary depending on a thickness of the elastic member 100. In addition, the depth d of the first pattern portion 410 may vary depending on a degree to which the elastic member 100 is folded, that is, a radius of curvature of the folded elastic member 100. Here, the depth d of the first pattern portion 410 may be defined as a maximum distance from the bottom surface BS of the first pattern portion 410 to the first surface 1S of the elastic member 100. In other words, the depth d of the first pattern portion 410 may be defined as a maximum distance from the bottom surface of the first pattern portion 410 to an upper surface of the second layer 120.

As an example, when the first pattern portion 410 is formed to completely penetrate the second layer 120, the depth d of the first pattern portion 410 should be equal to or greater than the thickness of the second layer 120. In addition, when the first pattern portion 410 is formed to partially penetrate the second layer 120, the depth d of the first pattern portion 410 may be less than the thickness of the second layer 120.

That is, the depth d of the first pattern portion 410 may be less than the thickness of the second layer 120 or greater than or equal to the thickness of the second layer 120.

The thickness t of the first pattern portion 410 may vary depending on the depth of the first pattern portion 410. When the depth of the first pattern portion 410 is greater than or equal to the thickness of the second layer 120, the thickness t of the first pattern portion 410 may be defined as the thickness of the first layer 110. In addition, when the depth of the first pattern portion 410 is less than the thickness of the second layer 120, the thickness t of the first pattern portion 410 may be defined as the thickness of the first layer 110 and the second layer 120.

The thickness t of the first pattern portion 410 may vary depending on a degree to which the elastic member 100 is folded, that is, a radius of curvature of the elastic member 100 after folding.

The thickness t of the first pattern portion 410 may vary depending on the depth of the first pattern portion 410. For example, when the depth of the first pattern portion 410 is equal to or greater than the thickness of the second layer 120, the thickness t of the first pattern portion 410 may be defined as the thickness of the first layer 110. In addition, when the depth of the first pattern portion 410 is less than the thickness of the second layer 120, the thickness t of the first pattern portion 410 may be defined as the thickness of the first layer 110 and the second layer 120.

The thickness t of the first pattern portion 410 may be defined as a thickness of the elastic member 100 remaining after the first pattern portion 410 is formed on the first surface 1S of the elastic member. That is, the thickness t of the first pattern portion 410 may be defined as a distance from the bottom surface BS of the first pattern portion 410 to the second surface 2S of the elastic member 100. In detail, the thickness t of the first pattern portion 410 may be defined as a maximum distance from the bottom surface BS of the first pattern portion 410 to the second surface 2S of the elastic member 100.

In detail, when the elastic member 100 is folded so that the radius of curvature of the elastic member 100 is 5 mm or less, the thickness t of the first pattern portion 410 may be 50 µm or less.

In detail, when the elastic member 100 is folded so that the radius of curvature is greater than 0.5 mm and 5 mm or less, the thickness t of the first pattern portion 410 may be 50 µm or less.

In this case, when the first pattern portion 410 is formed to completely penetrate the second layer 120, the thickness t of the first pattern portion 410 may be defined as the thickness of the first layer 110.

In addition, when the first pattern portion 410 is formed to partially penetrate the second layer 120, the thickness t of the first pattern portion 410 may be defined as a sum of thicknesses of the first layer 110 and the second layer 120.

In more detail, when the elastic member 100 is folded so that the radius of curvature is greater than 0.5 mm and 5 mm or less, the thickness t of the first pattern portion 410 may be 5 µm to 50 µm.

When the thickness t of the first pattern portion 410 is formed to be less than 5 µm in the radius of curvature of the elastic member 100, an elastic force of the elastic member is reduced due to a decrease in the thickness of the first pattern portion 410, and thus a restoring force restored after folding may be reduced and a supporting force for supporting the display panel disposed on the elastic member 100 may be reduced. The elastic force of the device may be lowered, so that the restoring force restored after folding may be reduced, and the supporting force for supporting the display panel disposed on the elastic member 100 may be reduced.

In addition, when the thickness t of the first pattern portion 410 is formed to be greater than 50 µm in the radius of curvature of the elastic member 100, plastic deformation occurs in the first region 1A, which is the folding region, due to an increase in the thickness of the first pattern portion 410 after folding, and thus the folding characteristics may be deteriorated.

The first pattern portion 410 may be disposed to extend in a plurality of directions. In detail, the first pattern portion 410 may extend in the first direction 1D corresponding to the length direction of the elastic member 100 and the second direction 2D corresponding to the width direction of the elastic member 100. That is, the first pattern portion 410 may extend in the first direction 1D corresponding to a long side direction of the elastic member 100 in the first region 1A of the elastic member 100 and in the second direction 2D corresponding to a short side direction of the elastic member 100.

A first pattern portion 410 extending in the first direction 1D and a first pattern portion 410 extending in the second direction 2D may extend in a direction crossing each other. The first pattern portion 410 extending in the first direction 1D and the first pattern portion 410 extending in the second direction 2D may be connected to each other. Accordingly, the first pattern portion 410 extending in the first direction 1D and the first pattern portion 410 extending in the second direction 2D may be integrally formed.

Referring to FIGS. 16 to 21, the second pattern portion 420 may be defined as the unetched region of the elastic member 100 unlike the first pattern portion 410 which is the etched region formed in the first region 1A.

That is, the second pattern portion 420 may be an embossed pattern remaining in the first region 1A after the first pattern portion 410, which is the intaglio pattern, is formed. Accordingly, an upper surface of the second pattern portion 420 may be disposed on the same plane as the first surface 1S of the elastic member 100.

That is, an upper surface of the second pattern portion 410 may be the upper surface of the second layer 120. In addition, the upper surface of the second pattern portion 410 may be the upper surface of the second layer 120, and a lower surface opposite to the upper surface of the second pattern portion 410 may be a lower surface of the first layer 110.

The second pattern portion 420 may include a plurality of second pattern portions. In detail, the second pattern portion 420 may include the plurality of second pattern portions spaced apart from each other. That is, the second pattern portions 420 may be dispose to be spaced apart from each other by the first pattern portions 410 disposed between the adjacent second pattern portions 420.

A height h of the second pattern portion 420 may be defined as a distance from the bottom surface BS of the first pattern portion 410 to the first surface 1S of the elastic member. That is, the height h of the second pattern portion 420 may be the same as or similar to the depth d of the first pattern portion 410.

In addition, the height h of the plurality of second pattern portions 420 may have a uniform height. In detail, a difference in height h between the plurality of second pattern portions 420 may be 3% or less. In more detail, the difference in height h between the plurality of second pattern portions 420 may be 1% to 3%.

When the difference in height h of the plurality of second pattern portions 420 exceeds 3%, a difference in depth d of the first pattern portions 410 disposed between the second pattern portions 420 increases, so that the thickness non-uniformity of the first pattern portion 410 may occur. Accordingly, a difference in a degree in which stress is distributed occurs depending on each region of the first pattern portions 410, and accordingly, the elastic member 100 may be bent and reliability may be deteriorated.

The second pattern portion 420 may include a plurality of second pattern portions having different shapes. In detail, the second pattern portion 420 may include a first pattern 421 and a second pattern 422 having different shapes.

Meanwhile, the drawings illustrate that the second pattern portion 420 is formed in a quadrangular shape, but the embodiment is not limited thereto, and the second pattern portion 420 may be formed in a circle shape having a curved surface or various polygonal shapes such as a triangle, a pentagon, a hexagon, etc. In addition, both the first pattern 421 and the second pattern 422 may be formed in a quadrangular shape, or any one of the first pattern 421 and the second pattern 422 may be formed in a circular shape, and the other pattern may be formed in a polygonal shape, or any one of the first pattern 421 and the second pattern 422 may be formed in a polygonal shape, and the other pattern may be formed in a polygonal shape different from any one pattern portion.

The first pattern 421 may be disposed to be spaced apart from each other in the first direction 1D and the second direction 2D. That is, the first pattern 421 may be disposed to be spaced apart from each other while extending in the length direction and the width direction of the elastic member 100.

Accordingly, the first pattern 421 may have a first interval s1 in the first direction 1D and a second interval s2 in the second direction 2D.

In addition, the second pattern 422 may be disposed to be spaced apart from each other in the first direction 1D and the second direction 2D. That is, the second pattern 422 may be disposed to be spaced apart from each other while extending in the length direction and the width direction of the elastic member 100.

Accordingly, the second pattern 422 may have a third interval s3 in the first direction 1D and a fourth interval s4 in the second direction 2D. In this case, the fourth interval s4 may be formed to be greater than the third interval s3.

By forming the fourth interval s4 greater than the third interval s3, folding of the elastic member 100 may be facilitated, and stress caused by folding may be reduced.

The first pattern 421 may be formed in a form extending in one direction. In detail, a length of the first pattern 421 may extend in the second direction 2D, and a width of the first pattern 421 may extend in the first direction 1D. That is, the first pattern 421 may have a long side formed in the second direction 2D and a short side formed in the first direction 1D.

The first pattern 421 may serve to fold the elastic member 100 together with the first pattern portion 410. That is, the elastic member 100 may reduce a thickness of the first region folded in the elastic member 100 by the first pattern portion 410 and the first pattern 421. Accordingly, in the elastic member 100, a stress generation region generated when the elastic member is folded may be reduced. That is, by reducing the thickness of the elastic member proportional to stress in the first region 1A which is the folding region of the elastic member, stress generated when the elastic member is folded may be reduced.

That is, since the thickness of the elastic member 100 is reduced by the first pattern portion 410 and the first pattern 421 in the region where the elastic member 100 is folded, it is possible to prevent the elastic member 100 from being deformed by folding stress.

The second pattern 422 may serve to distribute tensile stress. In detail, when the elastic member 100 is folded, tensile stress is generated in the elastic member, and the tensile stress is concentrated in a specific region, so that cracks or deformation such as bending may occur in the elastic member 100.

Accordingly, the second pattern 422 may be disposed between the first pattern portions 410, that is, at an appropriate position in the first pattern portion 410, to control movement of the tensile stress. Accordingly, it is possible to prevent bending or cracking of the elastic member 100 due to concentration of the tensile stress in a specific region when the elastic member 100 is folded.

To this end, the second pattern 422 may be disposed between the first patterns 421. That is, the second pattern 422 may be spaced apart from the first pattern 421 and disposed between the first patterns 421.

In detail, the second pattern 422 may be disposed to extend in the first direction between the first patterns 421 spaced apart in the second direction. That is, the second pattern 422 may be disposed to extend in the first direction within the second interval s2 of the first pattern 421 spaced apart in the second direction.

Through this, by preventing tensile stress generated in a direction perpendicular to a folding axis C of the elastic member 100 when the elastic member 100 is folded from being concentrated in one region, it is possible to prevent bending or cracking of the elastic member 100.

In addition, the plurality of second patterns 422 may be disposed to extend in the first direction. In detail, the plurality of second patterns 422 may be disposed at a position overlapping the folding axis C of the elastic member 100 between the first patterns 421 spaced apart from each other in the second direction. In addition, the second pattern 422 may be disposed to overlap an imaginary line parallel to the folding axis C of the elastic member 100.

Accordingly, when the elastic member is folded along the folding axis C, tensile stress moving through the first pattern portion 410 extending along the folding axis may be controlled by the second pattern 422, and thus it is possible to prevent stress from being concentrated in a specific region of the elastic member.

A length l of the second pattern 422 may be the same as or different from the first interval s1 of the first pattern 421. That is, both ends of the second pattern 422 in the first direction may overlap both ends of the first interval s1 of the first pattern 421 or may be disposed inside or outside the first pattern 421.

That is, the length l of the second pattern 422 in the first direction 1D may be the same as or different from a size of the first interval s1. That is, the length l of the second pattern 422 in the first direction 1D may be the same as, smaller than, or greater than the size of the first interval s1.

For example, the length l of the second pattern 422 may be equal to or less than twice a pitch p of the first patterns 421 in the first direction.

When the length l of the second pattern 422 is equal to or greater than the first interval s1 of the first pattern 421, the tensile stress moving along the folding axis may be effectively distributed by the second pattern 422, and thus it is possible to prevent stress from being concentrated on a side surface of the second pattern 422. Accordingly, it is possible to prevent cracks in a lateral direction of the second pattern 422.

In addition, when the length l of the second pattern 422 is smaller than the first interval s1 of the first pattern 421, the overall folding elastic force of the elastic member may be reduced due to a decrease in an area of the first pattern 421, but it is possible to effectively distribute the stress generated in the folding region of the elastic member, thereby preventing the stress from being concentrated in a specific region of the folding region. Accordingly, it is possible to prevent cracks in the folding region of the elastic member.

In addition, when the length l of the second pattern 422 exceeds twice the pitch p of the first patterns 421, plastic deformation occurs in the second pattern 422 after folding the elastic member 100 due to a size of the second pattern 422, and thus the folding characteristics of the elastic member may be deteriorated, and the elastic member may not be restored after folding.

Referring to FIG. 22, the second pattern 422 may be disposed in a zigzag manner in the second direction 2D of the elastic member 100.

In detail, the third interval s3 of the second pattern 422 disposed to be spaced apart from each other in the first direction of the elastic member 100 may be smaller than the fourth interval s4 disposed to be spaced apart from each other in the second direction. In addition, the length l of the second pattern 422 in the first direction may be smaller than the third interval s3 of the adjacent second pattern 422.

By disposing the second pattern 422 in the zigzag manner, a total area of the 2-2 pattern portion 422 disposed on the elastic member 100 may be reduced. Accordingly, by reducing the number of the second patterns 422 that are not etched in the first region 1A which is the folding region of the elastic member 100, a magnitude of the compressive stress proportional to the thickness in the first region 1A may be reduced. Accordingly, the elastic member 100 may be easily folded.

In addition, when the elastic member 100 is restored after folding, it may be easily restored by reducing the tensile stress of the elastic member, and at the same time, it is possible to improve folding reliability by preventing the tensile stress from being concentrated in a specific region due to the arrangement of the second pattern 422.

The elastic member according to the second embodiment may improve the supporting characteristics and folding characteristics of the elastic member.

In detail, since the first pattern portion is formed by partially etching the elastic member without penetrating the elastic member, it is possible to facilitate folding of the elastic member, and at the same time, to minimize deterioration in supporting characteristics due to the formation of the pattern portion.

In addition, by disposing the second pattern portion capable of distributing stress inside the first pattern portion in a direction parallel to the folding axis, it is possible to prevent the stress moving through the first pattern portion from being concentrated in a specific region of the elastic member.

Accordingly, it is possible to prevent an occurrence of cracks or bending in the elastic member due to the concentration of stress in a specific region of the elastic member.

In addition, in the elastic member according to the second embodiment, both the tensile properties and the elastic properties of the elastic member may be improved by forming the elastic member in a plurality of layers.

That is, a first layer having good tensile properties is formed as a support layer of the elastic member, and a second layer having a small elastic modulus is disposed on the first layer as a reinforcing layer, so that the tensile strength and supporting force of the elastic member are sufficiently provided by the first layer. It is possible to secure sufficient elastic force by facilitating the deformation of the elastic member through the second layer, Therefore, the elastic member according to the second embodiment may secure the elastic force together with the tensile properties of the elastic member, and thus may have improved the folding characteristics.

FIG. 23 is another top view of the first surface of the elastic member according to the second embodiment.

Referring to FIG. 23, in the elastic member 100, a plurality of pattern portions may also be formed in the second region 2A of the elastic member 100. In detail, a plurality of third pattern portions 430 spaced apart from each other may be disposed in the second region 2A of the elastic member 100.

The third pattern portion 430 may be formed as a hole or a groove. In detail, similar to the first pattern portion 410, the third pattern portion 430 may be formed an intaglio pattern in which the second region 2A of the first surface 1S of the elastic member 100 is partially etched.

That is, the third pattern portion 430 may be formed to completely penetrate the second layer 120 so as to expose one surface of the first layer 110, or the third pattern portion 430 may be formed to partially penetrate the second layer 120 so as to expose one surface of the second layer 120.

Alternatively, unlike the first pattern portion 410, the third pattern portion 430 may be formed in a hole shape formed to penetrate the first surface 1S and the second surface 2S of the elastic member 100.

That is, the third pattern portion 430 may be formed in the hole shape formed to completely penetrate the first layer 110 and the second layer 120.

A difference in deformation due to heat in the first region 1A in which the first pattern portion 410 is formed and the second region 2A in which the third pattern portion 430 is formed may be reduced by the third pattern portion 430 formed in the second region 2A.

In detail, by forming a pattern portion formed by partially or entirely etching the elastic member in both the first region 1A and the second region 2A, a difference between the deformation due to the heat in the first region 1A and the deformation due to the heat in the second region 2A may be relieved. Therefore, it is possible to prevent the elastic member from being bent or twisted.

In addition, it is possible to prevent bending of the elastic member by relieving unevenness of the stress between the first region 1A and the second region 2A by the third pattern portion 430 formed in the second region 2A.

In addition, when a panel or the like is adhered to the elastic member 100 through an adhesive layer, an adhesive material is disposed to fill the inside of the first and third pattern portions by the third pattern portion 430 formed in the second region 2A, and thus it is possible to prevent the adhesive layer from forming a step difference between the first and second regions.

The third pattern portion 430 may be formed in a regular pattern in the second region 2A. Alternatively, the third pattern portion 430 may be formed in an irregular pattern in the second region 2A. For example, the third pattern portion 430 may be formed in different shapes, or the third pattern portion 430 may be disposed in a zigzag position between adjacent columns.

The third pattern portion 430 may be formed to have a curved surface. In detail, the third pattern portion 430 may be formed in a shape having a curved surface such as an elliptical shape, a hemispherical shape, or a circular shape.

However, the embodiment is not limited thereto, and the third pattern portion 430 may be formed in a polygonal shape such as a triangle or a quadrangle, or may include a curved surface and a polygonal shape together.

In addition, as the third pattern portion approaches the first region, a density of the third pattern portion 430 may be formed to be high. That is, as the third pattern portion approaches the first region, a distance of the third pattern portion 430 decreases, or as the third pattern portion approaches the first region, the density of the third pattern portion 430 may be formed to be high by increasing a size of the third pattern portion 430.

Through this, the difference between the deformation due to heat in the first region 1A and the deformation due to the heat in the second region 1A may be further relieved.

FIG. 24 is another top view of the first surface of the elastic member according to the second embodiment.

Referring to FIG. 24, the elastic member 100 may further include a hinge portion.

For example, the first region 1A and the second region 2A may be distinguished according to whether the hinge portion is formed. That is, the folding region and the unfolding region may be divided according to whether the hinge portion is formed.

In detail, a plurality of hinge portions may be formed in the first region 1A, and the hinge portions may not be formed in the second region 2A.

That is, the folding region may be defined as a region in which a hinge portion HN is formed.

The hinge portion HN may be defined as a point at which folding starts in the elastic member 100. That is, in the elastic member, folding may start from hinge portions at both ends of the plurality of hinge portions. The hinge portion HN may facilitate folding of the elastic member 100.

The hinge portion HN may include the plurality of hinge portions according to a folding shape of the elastic member 100. The hinge portion HN may be formed at both ends of the elastic member 100 based on a length of a transverse direction that is the width direction of the elastic member 100. That is, the hinge portion HN may be formed at both ends of the elastic member 100 defining the folding axis of the elastic member 100.

Accordingly, when the elastic member 100 for the display is folded, the folding region may be easily folded by the hinge portion HN.

The hinge portion HN may be formed by penetrating the first and second surfaces of a region of the transverse direction among the end regions of the elastic member 100. That is, the hinge portion HN may be defined as a hole in which both end regions of the transverse direction among the end regions of the elastic member 100 are formed to be penetrated.

The hinge portion HN may be formed to have a flat surface or a curved surface. In detail, the hinge portion may be formed in a shape having a curved surface such as an elliptical shape, a hemispherical shape, or a circular shape.

However, the embodiment is not limited thereto, and the hinge portion may be formed in the elliptical shape or a polygonal shape such as a triangle or a quadrangle.

FIG. 25 is a view for describing an example in which the elastic member according to the embodiments is applied.

Referring to FIG. 25, the elastic member according to the embodiments may be applied to a flexible or foldable display device for displaying a display.

For example, the elastic member according to the embodiments may be applied to a flexible display device such as a mobile phone or a tablet.

Such an elastic member may be applied to a flexible display device such as a mobile phone or a tablet that is flexible, bent, or folded.

The elastic member is applied to the flexible display device such as the mobile phone or the tablet that is flexible, bent or folded and improves the folding reliability in a display device that is repeatedly folded or folded, thereby improving the reliability of the flexible display device.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present disclosure.

In addition, embodiments are mostly described above, but the embodiments are merely examples and do not limit the present disclosure, and a person skilled in the art may appreciate that several variations and applications not presented above may be made without departing from the essential characteristic of embodiments. For example, each component specifically shown in the embodiments may be modified and implemented. In addition, it should be construed that differences related to such a variation and such an application are included in the scope of the present disclosure defined in the following claims.

The invention claimed is:

1. An elastic member comprising:
    a first surface and a second surface opposite to the first surface; and
    a first region and a second region,
    wherein a first direction is defined to correspond to a length direction of the elastic member and a second direction is defined to correspond to a width direction of the elastic member,
    the first region is defined as a folding region, and the second region is defined as an unfolding region,
    a first pattern portion having an intaglio shape and a second pattern portion having an embossed shape are formed in the first region,
    the second pattern portion includes a plurality of first patterns and a plurality of second patterns that are spaced apart from each other, and
    a length of the first patterns of the second pattern portion extend in the second direction or parallel to the second direction, and a length of the second patterns of the second pattern portion extend in the first direction or parallel to the first direction.

2. The elastic member of claim 1, wherein the first pattern portion includes an inner surface and a bottom surface connected to the inner surface, and
    the bottom surface of the first pattern portion has a radius of curvature of 0.1 mm or more.

3. The elastic member of claim 1, wherein the first pattern portion extends in the first direction and the second direction, two of the first patterns of the second pattern portion are disposed to be spaced apart in the second direction, and one of the second patterns of the second pattern portion is disposed between the two of the first patterns of the second pattern portion adjacent in the second direction.

4. The elastic member of claim 1, wherein the first pattern portion extending in the first direction and the second pattern portion extending in the second direction are connected to each other.

5. The elastic member of claim 1, wherein a difference in height of the second pattern portion is 1% to 3%.

6. The elastic member of claim 1, wherein two of the first patterns of the second pattern portion are disposed to be spaced apart by a first interval in the first direction, and the length of one of the second patterns of the second pattern portion in the first direction is equal to or greater than a size of the first interval.

7. The elastic member of claim 1, wherein two of the first patterns of the second pattern portion are disposed to be spaced apart by a first interval in the first direction, and the length of one of the second patterns of the second pattern portion in the first direction is equal to or less than a size of the first interval.

8. The elastic member of claim 1, wherein the length of one of the second patterns of the second pattern portion is equal to or less than twice a pitch in the first direction of two of the first patterns of the second pattern portion.

9. The elastic member of claim 1, wherein the second patterns of the second pattern portion are spaced apart at a third interval in the first direction and spaced apart at a fourth interval in the second direction, and the fourth interval is greater than the third interval.

10. The elastic member of claim 1, wherein one of the second patterns of the second pattern portion is disposed at a position overlapping an imaginary line parallel to a folding axis of the elastic member between two of the first patterns of the second pattern portion.

11. The elastic member of claim 1, wherein at least three of the second patterns of the second pattern portion are disposed in a zigzag manner in the second direction.

12. The elastic member of claim 11, wherein the second patterns of the second pattern portion are spaced apart at the third interval in the first direction and spaced apart at the fourth interval in the second direction, the third interval is smaller than the fourth interval, and the length of one of the second patterns of the second pattern portion is smaller than the third interval.

13. The elastic member of claim 1, wherein further comprising a third pattern portion disposed in the second region.

14. A display device comprising:
an elastic member;
a panel disposed on the elastic member and including at least one of a display panel and a touch panel; and
an adhesive layer disposed between the elastic member and the panel, wherein the elastic member includes the elastic member according to claim 1.

15. An elastic member comprising:
a first surface and a second surface opposite to the first surface;
a first region and a second region; and
a first layer and a second layer disposed on the first layer,
wherein the first region is defined as a folding region, and the second region is defined as an unfolding region,
a first pattern portion having an intaglio shape and a second pattern portion having an embossed shape are formed on the second layer of the first region,
the second pattern portion includes a plurality of first patterns and a plurality of second patterns that are spaced apart from each other,
a length of the first patterns of the second pattern portion extend in a second direction or parallel to the second direction, and a length of the second patterns of the second pattern portion extend in a first direction or parallel to the first direction,
a tensile strength of the first layer is greater than that of the second layer, and
an elastic modulus of the first layer is greater than that of the second layer.

16. The elastic member of claim 15, wherein one of the second patterns of the second pattern portion is disposed at a position overlapping an imaginary line parallel to a folding axis of the elastic member between two of the first patterns of the second pattern portion.

17. The elastic member of claim 15, wherein the first pattern portion extends in the first direction and the second direction-,
two of the first is patterns of the second pattern portion are disposed spaced apart in the second direction, and
at least one of the second patterns of the second pattern portion is disposed between the two of the first patterns of the second pattern portion adjacent in the second direction.

18. The elastic member of claim 15, wherein two of the first patterns of the second pattern portion are disposed to be spaced apart by a first interval in the first direction, and
the length of one of the second patterns of the second pattern portion in the first direction is equal to or greater than a size of the first interval.

19. The elastic member of claim 15, wherein two of the first patterns of the second pattern portion are disposed to be spaced apart by a first interval in the first direction, and
the length of one of the second patterns of the second pattern portion in the first direction is equal to or less than a size of the first interval.

20. The elastic member of claim 15, wherein the second patterns of the second pattern portion are spaced apart at a third interval in the first direction and spaced apart at a fourth interval in the second direction, and
the fourth interval is greater than the third interval.

* * * * *